(12) United States Patent
Parker et al.

(10) Patent No.: US 7,767,775 B2
(45) Date of Patent: Aug. 3, 2010

(54) CONTROLLED POLYMERIZATION

(75) Inventors: Dane Kenton Parker, Massillon, OH (US); Frank James Feher, Copley, OH (US); Viswanath Mahadevan, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 818 days.

(21) Appl. No.: 11/454,742

(22) Filed: Jun. 16, 2006

(65) Prior Publication Data

US 2006/0241258 A1    Oct. 26, 2006

Related U.S. Application Data

(62) Division of application No. 11/186,305, filed on Jul. 21, 2005, now Pat. No. 7,098,280, which is a division of application No. 10/721,718, filed on Nov. 25, 2003, now Pat. No. 6,992,156.

(60) Provisional application No. 60/437,542, filed on Dec. 31, 2002.

(51) Int. Cl.
*C08F 4/00* (2006.01)

(52) U.S. Cl. ............... 526/204; 526/217; 526/218.1; 526/219.5; 526/219.6; 526/227; 524/457

(58) Field of Classification Search ............ 524/457; 526/204, 217, 218.1, 219.5, 219.6, 227
See application file for complete search history.

(56) References Cited

U.S. PATENT DOCUMENTS

| | | | | |
|---|---|---|---|---|
| 4,581,429 | A | 4/1986 | Solomon et al. | 526/220 |
| 5,401,804 | A | 3/1995 | Georges et al. | 525/267 |
| 5,990,224 | A | 11/1999 | Raynolds et al. | 524/501 |
| 6,262,169 | B1 | 7/2001 | Helmer et al. | 524/555 |
| 6,262,206 | B1 | 7/2001 | Nesvadba et al. | 526/220 |
| 6,353,065 | B1 | 3/2002 | Charleux et al. | 526/220 |
| 6,472,485 | B2 | 10/2002 | Macleod et al. | 526/204 |
| 6,518,364 | B2 | 2/2003 | Charmot et al. | 526/219 |
| 6,737,488 | B2 | 5/2004 | Vanhoorne et al. | 526/220 |
| 7,008,990 | B2 * | 3/2006 | Raether et al. | 524/457 |

FOREIGN PATENT DOCUMENTS

| | | |
|---|---|---|
| EP | 970973 A1 | 1/2000 |
| JP | 74005610 B * | 2/1974 |
| WO | WO 98/32726 | 7/1998 |
| WO | WO 0196408 A2 * | 12/2001 |

OTHER PUBLICATIONS

Database Zcaplus "Online Chemical Abstracts" Prokopov N. I., Gritskova I.A. "Characterstic features of heterophase polymerisation of styrene with simultaneous formation of surfactants at the interface" retrieved from STN, accession No. 2002:150470 Database accession No. 136:325847 XP002276879.
Prokopov N. I., Gritskova I.A. "Characterstic features of heterophase polymerisation of styrene with simultaneous formation of surfactants at the interface"(*Russ. Chem. Rev.* vol. 70 No. 9, 2001, pp. 791-800).
Cunningham, Michael F. "Living/controlled radical polymerizations in dispersed phase systems" (*Prog. Polym. Sci.* 27 (2002)1039-1067).
Butte, Alessandro, et al "Miniemulsion Living Free Radical Polymerization of Styrene" (*Macromolecules* 2000, 33, 3485-3487).
Gilbert, Robert G., et al "RAFT in Emulsion Polymerization: What Makes it Different" (*Polymer Preprints* 2002, 43(2), 130).
Bon, Stefan A.F. et al, "Controlled Radical Polymerization in Emulsion" (*Macromolecules* 1997, 30, 324-326).
Moad, Graeme, et al, "Living freed radical polymerization with reversible addition—fragmentation chain transfer (the life of RAFT)" (*Polym Int* 49:193-1001 (2000)).

\* cited by examiner

*Primary Examiner*—Kelechi C Egwim
(74) *Attorney, Agent, or Firm*—Alvin T. Rockhill

(57) ABSTRACT

The present invention discloses an emulsion polymerization process that comprises: (1) preparing an aqueous polymerization medium which is comprised of (a) at least one monomer, (b) a polymerization control agent, and an emulsifier, wherein the emulsifier is prepared in-situ within the aqueous polymerization medium; and (2) initiating polymerization of said monomer within the aqueous polymerization medium. The subject invention more specifically reveals an emulsion polymerization process that comprises: (1) preparing a monomer solution which is comprised of (a) at least one monomer, (b) a conjugate acid of a surfactant with a $pK_a$ of less than 14, and (c) a controlled free radical polymerization agent; (2) preparing an aqueous medium which is comprised of (a) water, and (b) a conjugate base of a weak acid wherein the $pK_b$ of the base is less than 14; and (3) mixing the monomer solution with the aqueous medium under conditions that result in the in-situ formation of an emulsifier, and (4) initiating free radical polymerization.

4 Claims, No Drawings ental problems are related to slow initiation coupled with
CONTROLLED POLYMERIZATION This is a divisional and a continuation-in-part application of U.S. patent application Ser. No. 11/186,305, filed on Jul. 21, 2005 now U.S. Pat. No. 7,098,280, which was a divisional application of U.S. patent application Ser. No. 10/721,718, filed on Nov. 25, 2003, now issued as U.S. Pat. No. 6,992,156, which claims the benefit of U.S. Provisional Application Ser. No. 60/437,542, filed on Dec. 31, 2002.

FIELD OF THE INVENTION

This invention pertains to methods and compositions for controlled polymerization in an emulsion system under a wide variety of conditions and with a wide variety of monomers. This invention also pertains to methods for producing emulsion systems. Furthermore, this invention also pertains to polymers and copolymers that can be made with such systems.

BACKGROUND OF THE INVENTION

Synthetic polymers are a broad family of materials with a remarkable range of applications. The fundamental building blocks for polymers are called monomers, and numerous methods have been devised for producing polymers from monomers. The earliest efforts to produce polymers focused on controlling the molecular formulas of polymers and producing useful materials from readily available chemical feedstocks. As the field advanced, the importance of molecular structure in dictating many polymer properties became apparent, and techniques for controlling the molecular structures of polymers began to emerge. Both the number of techniques and their ability to achieve structural control at the molecular level have increased greatly over the past two decades. This trend is expected to continue as most areas of science and engineering increasingly focus on controlling the structure and properties of materials on a size scale ranging from several nanometers to several hundred nanometers.

For synthetic polymers, molecular structures are most often controlled during the polymerization process, which typically involves the formation of macromolecules from many smaller molecules (e.g., monomers). The degree of control depends on many factors and there is considerable debate about the nomenclature to be used in describing various forms of "controlled polymerization". However, there is a growing consensus that use of the term "controlled polymerization" is appropriate when describing processes from which polymers with predetermined molar masses and low polydispersities can be obtained. Polymerization also can be defined as "controlled" if side reactions occur, but only to an extent which does not considerably disturb the control of the molecular structure of the polymer chain. Most major classes of chain polymerization, including anionic, cationic, ring-opening metathesis (ROMP), coordination and radical polymerization, can be performed as "controlled" polymerization processes under appropriate conditions.

Regardless of the process, the key to achieving the conditions necessary for controlled polymerization is to facilitate productive steps in the process while discouraging unwanted side reactions. Historically, this has been accomplished in part by minimizing or eliminating water from the system. With the discovery of more functional group tolerant catalysts for coordination polymerization, olefin metathesis and cationic polymerization—as well as methods for achieving controlled free radical polymerization—the presence of water no longer represents an insurmountable obstacle. In fact, the continuing drive for more environmentally benign, water-based manufacturing processes and products provides strong incentives for developing aqueous processes for controlled polymerization. Controlled emulsion polymerization is particularly attractive for water-insoluble monomers and polymers, and there is intense worldwide competition in both academic and industrial circles to develop practical emulsion processes.

A review of the literature indicates that, in general, conventional emulsion polymerization techniques do not work well for controlled polymerization. In many cases, the fundamental problems are related to slow initiation coupled with slow transport of the "active" agent or its precursor through the water phase and into the growing polymer particles. In order to circumvent these problems, many groups have used newer techniques for achieving better emulsions and faster rates. The most common technique is "miniemulsion". With this technique, a preformed conventional emulsion of monomer(s), surfactant, a hydrophobe and water is treated under high shear conditions with a homogenizer or ultrasonic horn to prepare much finer, self-stabilized droplets. The fine droplets become the locus for polymerization, bypassing the need for transport through the water phase. The two main drawbacks of the miniemulsion technique are: (1) the need for specialized and expensive equipment, and (2) the use of a hydrophobe (e.g., hexadecane), which is undesirable for many potential applications.

A second technique for producing fine droplets is "microemulsion", which typically produces initial monomer droplets in the range of 5 nm and final polymer particles in the range of 30 nm to 40 nm. This technique usually requires very large amounts of surfactant, and it rarely is used for controlled polymerization because the amount of surfactant often equals or exceeds the amount of monomer present.

A third technique for achieving controlled emulsion polymerization utilizes a seeding process to initiate polymerization. With this technique, a fraction of the monomer is first mixed with initiator, control agent, water and surfactant. This combination is mixed and allowed to react for a period of time before additional monomer is added. The intent of the first stage is to allow the initiator to form "living" oligomers or "seeds" under conditions where the surfactant-to-monomer ratio is relatively large (i.e., microemulsion). Although this technique has some advantages over miniemulsion because it does not require a hydrophobe or specialized equipment, it does not solve the fundamental problems associated with the use of controlled polymerization technologies in emulsion, such as slow initiation or long reaction times compared to solution reactions.

In assessing this situation, what appears to be necessary for practical emulsion processes based on controlled polymerization technology is a method for: (1) producing stable emulsions without hydrophobes or special equipment; (2) utilizing conventional surfactants and soap levels; (3) effecting rapid initiation and propagation; and (4) achieving complete conversion within a reasonable period of time.

SUMMARY OF THE INVENTION

This invention provides a general method for achieving controlled polymerization of monomers in emulsion via all major chain polymerization mechanisms, including free radical, carbocationic, anionic, ring-opening metathesis and coordination polymerization. This invention therefore provides access to a wide variety of resultant polymers, ranging from homopolymers and random copolymers to block copolymers with complex architectures (e.g., hyperbranched, brushes, core-shell, stars). It is thus an object of this invention to provide a controlled polymerization process that allows a wide variety of monomers to be polymerized alone or together in emulsion.

The methods of this invention enable access to a full range of initiators and agents for controlled polymerization, including initiators and control agents that might otherwise appear to be less effective for an aqueous-based process. This is accomplished by combining fundamental principles of controlled polymerization with a new principle for microemulsification described by Russian researchers in a recent article (Russ. Chem. Rev. 2001, 70, 791). To the best of our knowledge, this combination of techniques never before has been reported. The present invention provides a simple, versatile and highly effective method for achieving controlled polymerization in emulsion without resorting to miniemulsion techniques, microemulsion techniques requiring large amounts of surfactant, or multistep seeded processes for producing stable emulsions.

The present invention discloses an emulsion process that comprises: (1) preparing an aqueous polymerization medium which is comprised of at least one monomer, a polymerization control agent, and an emulsifier, wherein the emulsifier is prepared in-situ within the aqueous polymerization; and (2) initiating polymerization of said monomer within the aqueous polymerization medium. The control agent can be an agent for controlled free radical polymerization by all major mechanisms, including reversible-addition fragmentation transfer (RAFT), nitroxide-mediated polymerization (NMP), atom transfer radical polymerization (ATRP) and degenerative transfer (DT). Control agents for related controlled free radical polymerization processes, such as diphenylethylene (DPE)-mediated polymerization and xanthate-based RAFT (MADIX), also can be used. The control agent also can be an agent for polymerization by non-radical mechanisms, such as cationic, anionic, ring-opening metathesis (ROMP), acyclic diene metathesis (ADMET) and coordination polymerization. The control agent can be added directly to the reaction mixture or generated in-situ.

An important aspect of this invention is in-situ generation (Russ. Chem. Rev. 2001, 70, 791) of the emulsifier by reaction of an organic-soluble latent surfactant and a water-soluble surfactant activator in an aqueous medium in the presence of at least one monomer, wherein the monomer has limited solubility in water. The emulsifier can be an anionic surfactant, a cationic surfactant, a non-ionic surfactant, or a combination of these surfactants. A broad range of chemical reactions, including acid/base neutralization, hydrolysis, nucleophilic addition and substitution, can be used to produce emulsifiers in-situ from a wide variety of latent surfactant/surfactant activator combinations.

The present invention further reveals an emulsion polymerization process that comprises: (1) preparing a aqueous polymerization medium which is comprised of (a) at least one monomer, (b) a polymerization control agent, and an emulsifier, wherein the emulsifier is prepared in-situ within the aqueous polymerization medium; and (2) initiating polymerization of said monomer within the aqueous polymerization medium.

The present invention also discloses an emulsion polymerization process that comprises: (1) preparing a monomer solution which is comprised of (a) at least one monomer, (b) a conjugate acid of a surfactant with a $pK_a$ of less than 14, and (c) a controlled free radical polymerization agent; (2) preparing an aqueous medium which is comprised of (a) water, and (b) a conjugate base of a weak acid wherein the $pK_b$ of the base is less than 14; and (3) mixing the monomer solution with the aqueous medium under conditions that result in the in-situ formation of an emulsifier, and (4) initiating free radical polymerization.

By utilizing the technique of this invention, it is possible to synthesize copolymers that cannot be made utilizing conventional polymerization techniques. More specifically, the emulsion polymerization process of this invention can be used in the preparation of block copolymers that cannot be prepared by utilizing either conventional emulsion or conventional solution polymerization processes. More specifically, the technique of this invention allows for the preparation of block copolymers that include blocks of one or more monomers that can be polymerized only by free radical polymerization. This invention more specifically relates to a block copolymer comprised of an A block and a B block wherein the A block is a block of a vinyl aromatic monomer and wherein the B block is a block of a nitrile rubber having repeat units that are comprised of (a) a conjugated diene monomer, and (b) acrylonitrile and/or methacrylonitrile. Such block copolymers can be diblocks or triblocks of A-B or A-B-A polymer architecture. In general the A block can be virtually any vinyl aromatic monomer and the B block can be a nitrile rubber block. The vinyl aromatic monomer utilized in such polymers will typically be styrene, α-methyl styrene, t-butyl styrene, vinyl-naphthalene, or divinylbenzene. The conjugated diolefin monomer will typically be 1,3-butadiene or isoprene. A-B-A triblock polymers of this type will typically contain from 5 weight percent to 30 weight percent of the vinyl aromatic block and from 70 weight percent to 95 weight percent of the nitrile rubber block. A-B-A triblock polymers of this type will more typically contain from 12 weight percent to 25 weight percent of the vinyl aromatic block and from 75 weight percent to 88 weight percent of the nitrile rubber block. A-B diblock polymers of this type will typically contain from 30 weight percent to 70 weight percent of the vinyl aromatic block and from 30 weight percent to 70 weight percent of the nitrile rubber block.

Other aspects of this invention will be evident to those of skill in the art upon review of this specification, drawings and examples.

DETAILED DESCRIPTION OF THE INVENTION

The present invention is directed toward a process for controlled polymerization in an emulsion system. Control is achieved by using a "control agent", which provides the reaction pathway and resulting kinetic behavior of "living"-type polymerization processes. There is considerable debate within the chemical community over the nomenclature to be used for describing what are often called "living" or "controlled" polymerization reactions. The term "living polymerization" was first introduced in 1956 by Szwarc (Nature 1956, 178, 1168-9) to describe anionic chain polymerization that proceeds without the occurrence of irreversible chain-breaking processes, such as chain transfer and termination. Such a polymerization provides strict control of the polymer end-group and allows the synthesis of block copolymers via sequential polymerization of two or more monomers. Since then, many other chain polymerization processes have been developed to produce block copolymers. Most of these processes are not exempt from chain transfer or chain termination reactions. To distinguish between these processes and "living" polymerization as defined by Szwarc, terms such as "controlled", "pseudo-living", "quasi-living" and "controlled/living" polymerization have been introduced. The term "controlled" is used herein to describe all polymerization processes from which polymers with predetermined molar masses and low polydispersities can be obtained.

As used herein, the phrase "characterized by the formula" is not intended to be limiting and is used in the same way that "comprising" is commonly used. The term "independently selected" is used herein to indicate that the choices can be identical or different. In the case of R groups, for example, the term "independently selected" indicates that the R groups (e.g., $R^1$, $R^2$, $R^3$) can be identical (e.g., $R^1$, $R^2$ and $R^3$ all may be substituted alkyl groups) or different (e.g., $R^1$ and $R^2$ may be substituted alkyl groups and $R^3$ may be an aryl group). Unless specified otherwise, a named R group will have the structure recognized in the art as corresponding to R groups with that name. For the purposes of illustration, representative R groups are defined herein. These definitions are intended to supplement and illustrate, not preclude, the definitions known to those of skill in the art.

The term "alkyl" is used herein to refer to a branched or unbranched, saturated or unsaturated acyclic hydrocarbon radical. Typical alkyl radicals include, for example, methyl, ethyl, n-propyl, i-propyl, 2-propenyl (or allyl), n-butyl, i-butyl, t-butyl (or 2-methylpropyl), pentyl, hexyl, vinyl (or alkenyl), alkynyl, etc. In particular embodiments, alkyls have between 1 and 200 carbon atoms or 1 and 50 carbon atoms or 1 and 20 carbon atoms.

The term "cycloalkyl" refers to a saturated or unsaturated cyclic nonaromatic hydrocarbon radical having a single ring or multiple condensed or fused rings. Suitable cycloalkyls include, for example, cyclopentyl, cyclohexyl, cyclooctenyl, bicycloheptyl, etc. In particular embodiments, cycloalkyls have between 3 and 200 carbon atoms or 3 and 50 carbon atoms or 3 and 20 carbon atoms.

"Substituted alkyl" refers to an alkyl as just described in which one or more hydrogen atoms attached to carbon of the alkyl is replaced by another group, such as halogen, aryl, substituted aryl, cycloalkyl, substituted cycloalkyl, and combinations thereof. Suitable substituted alkyls include, for example, benzyl and trifluoromethyl.

"Substituted cycloalkyl" refers to a cycloalkyl as just described in which one or more hydrogen atoms attached to carbon of the cycloalkyl is replaced by another group, such as halogen, alkyl, substituted alkyl, aryl, substituted aryl, cycloalkyl, substituted cycloalkyl, heterocycloalkyl, heteroaryl, substituted heteroaryl, alkoxy, aryloxy, boryl, phosphino, amino, silyl, thio, seleno and combinations thereof. Suitable substituted cycloalkyls include, 4-methoxycyclohexyl and 4,5-dibromocycloheptyl-4-enyl.

The term "heteroalkyl" refers to an alkyl or a substituted alkyl as described above in which one or more hydrogen atoms attached to carbon of the alkyl is replaced by a heteroatom from the group consisting of N, O, P, B, S, Si, Se and Ge. The bond between the carbon atom and the heteroatom may be saturated or unsaturated. Thus, an alkyl substituted with a heterocycloalkyl, substituted heterocycloalkyl, heteroaryl, substituted heteroaryl, alkoxy, aryloxy, boryl, phosphino, amino, imino, silyl, thio or seleno is within the scope of the term heteroalkyl. Suitable heteroalkyls include, for example, cyano, benzoyl, 2-pyridyl, 2-furyl, $Me_3SiO(CH_2)_3CH_2$, $(c\text{-}C_6H_{11})_7Si_8O_{12}(CH_2)_2CH_2$.

The term "heterocycloalkyl" refers to a cycloalkyl radical as described, but in which one or more or all carbon atoms of the saturated or unsaturated cyclic radical are replaced by a heteroatom from the group consisting of N, O, P, B, S, Si, Se and Ge. Suitable heterocycloalkyls include, for example, piperazinyl, morpholinyl, tetrahydropyranyl, tetrahydrofuranyl, piperidinyl and pyrrolidinyl.

The term "substituted heterocycloalkyl" refers to heterocycloalkyl as just described, but in which one or more hydrogen atoms on any atom of the heterocycloalkyl is replaced by another group such as a halogen, alkyl, substituted alkyl, aryl, substituted aryl, cycloalkyl, substituted cycloalkyl, heterocycloalkyl, heteroaryl, substituted heteroaryl, alkoxy, aryloxy, boryl, phosphino, amino, silyl, thio, seleno and combinations thereof. Suitable substituted heterocycloalkyl radicals include, for example, N-methylpiperazinyl, 3-dimethylaminomorpholine.

The term "aryl" refers to an aromatic substituent which may be a single aromatic ring or multiple aromatic rings which are fused together, linked covalently, or linked to a common group such as a methylene or ethylene moiety. The common linking group may also be a carbonyl as in benzophenone or a heteroatom, such as oxygen in the case of diphenylether or nitrogen in the case of diphenylamine. The aromatic ring(s) may include phenyl, naphthyl, biphenyl, diphenylether, diphenylamine and benzophenone among others. In particular embodiments, aryls have between 1 and 200 carbon atoms or 1 and 50 carbon atoms or 1 and 20 carbon atoms.

The term "substituted aryl" refers to aryl as just described in which one or more hydrogen atoms attached to any carbon atoms is replaced by one or more functional groups such as alkyl, substituted alkyl, cycloalkyl, substituted cycloalkyl, heterocycloalkyl, substituted heterocycloalkyl, halogen, halogenated alkyl (e.g., $CF_3$), hydroxy, amino, phosphino, alkoxy, amino, thio and both saturated and unsaturated cyclic hydrocarbons which are fused to the aromatic ring (s), linked covalently or linked to a common group such as a methylene or ethylene moiety. The linking group may also be a carbonyl such as in cyclohexyl phenyl ketone. Specific example of substituted aryls include perfluorophenyl, chlorophenyl, 3,5-dimethylphenyl, 2,6-diisopropylphenyl and the like.

The term "heteroaryl" refers to aromatic rings in which one or more carbon atoms of the aromatic ring (s) are replaced by a heteroatom (s) such as nitrogen, oxygen, boron, selenium, phosphorus, silicon or sulfur. Heteroaryl refers to structures that may be a single aromatic ring, multiple aromatic ring(s), or one or more aromatic rings coupled to one or more non-aromatic ring(s). In structures having multiple rings, the rings can be fused together, linked covalently, or linked to a common group such as a methylene or ethylene moiety. The common linking group may also be a carbonyl as in phenyl pyridyl ketone. As used herein, rings such as thiophene, pyridine, isoxazole, phthalimide, pyrazole, indole, furan, etc. or benzo-fused analogues of these rings are defined by the term "heteroaryl."

The term "substituted heteroaryl" refers to heteroaryl as just described including in which one or more hydrogen atoms on any atom of the heteroaryl moiety is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heteroaryl radicals include, for example, 4-N,N-dimethylaminopyridine.

The term "alkoxy" refer to the —OZ' radical, where Z' is selected from the group consisting of alkyl, substituted alkyl, cycloalkyl, substituted cycloalkyl, heterocycloalkyl, substituted heterocycloalkyl, silyl groups and combinations thereof as described herein. Suitable alkoxy radicals include, for example, methoxy, ethoxy, benzyloxy, t-butoxy, and the like. A related term is "aryloxy" where Z' is selected from the group consisting of aryl, substituted aryl, heteroaryl, substituted heteroaryl, and combinations thereof. Examples of suitable aryloxy radicals include phenoxy, substituted phenoxy, 2-pyridinoxy, 8-quinalinoxy and the like.

The term "silyl" refers to the —$SiZ^1Z^2Z^3$ radical, where each of $Z^1$, $Z^2$, and $Z^3$ is independently selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

The term "boryl" refers to the —$BZ^1Z^2$ group, where each of $Z^1$ and $Z^2$ is independently selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

The term "phosphino" refers to the group $PZ^1Z^2$, where each of $Z^1$ and $Z^2$ is independently selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

The term "amino" refers to the group —$NZ^1Z^2$, where each of $Z^1$ and $Z^2$ is independently selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "thio" refers to the group SZ', where Z' is selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

The term "seleno" refers to the group-SeZ', where Z' is selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

The term "saturated" refers to lack of double and triple bonds between atoms of a radical group such as ethyl, cyclohexyl, pyrrolidinyl, and the like.

The term "unsaturated" refers to the presence one or more double and triple bonds between atoms of a radical group such as vinyl, acetylenyl, oxazolinyl, cyclohexenyl, acetyl and the like.

When a bond is drawn in a chemical formula without a specific moiety or atom at the end, it is intended that standard chemical nomenclature is followed and the bond represents a methyl group at the appropriate position or a point of attachment.

For the purposes of illustration, polymerizations will be categorized according to mechanistic similarities into the following 10 types: atom transfer radical polymerization (ATRP), nitroxide mediated polymerization (NMP), reversible addition-fragmentation transfer (RAFT), degenerative transfer (DT), anionic polymerization, cationic polymerization, coordination polymerization, ring opening metathesis polymerization, (ROMP), acyclic diene metathesis polymerization (ADMET), and other polymerization reactions involving stable free radicals (SFR). These categories and the corresponding descriptions of polymerization mechanisms are intended to illustrate specific embodiments, and they are not intended to preclude any other polymerization mechanism recognized by those skilled in the art.

Atom Transfer Radical Polymerization (ATRP)

ATRP is a catalyzed, reversible redox process that achieves controlled polymerization via facile transfer of labile radicals (i.e., X) between growing polymer chains (P) and a control agent (i.e., M-L). Normally, the labile radical is a halogen atom (i.e., X=I, Br or Cl) and the control agent is a metal/ligand combination that is stable in two different oxidation states related by inner-sphere electron transfer of X (for example, M-L and X-M-L). Chain polymerization can be initiated in two ways. For "direct ATRP", initiation most often is accomplished by reacting a control agent (i.e., M-L) with an initiator containing very labile X groups (i.e., Q-X). For "reverse ATRP", the initiator typically is a conventional free radical initiator (i.e., Q-Q) and both the labile radical (X) and the control agent (M-L) are introduced together in the form of a metal halide complex (i.e., X-M-L). The key mechanistic features of both ATRP mechanisms are illustrated in Scheme 1. The state of the art has been regularly and extensively reviewed by Matyjaszewski (*Adv. Polym. Sci.* 2002, 159, 1; *Prog. Polym. Chem.* 2001, 26, 337; *Chem Rev.* 2001, 101, 2921).

Scheme 1

Direct ATRP Initiation

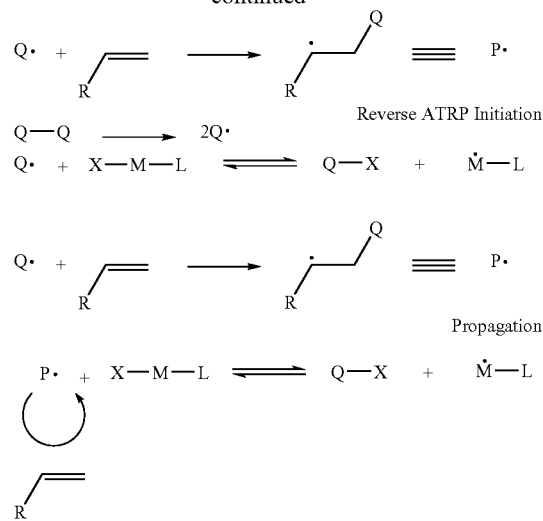

Nitroxide Mediated Polymerization (NMP)

The use of nitroxides to mediate (i.e., control) free radical polymerization has been developed extensively. Many different types of nitroxides have been described and there are many methods for producing nitroxides in-situ. Regardless of the nitroxide or its method of generation, the key mechanistic feature of NMP is reversible coupling of the nitroxide (i.e., $R_2NO.$) to a growing polymer chain radical (P.).

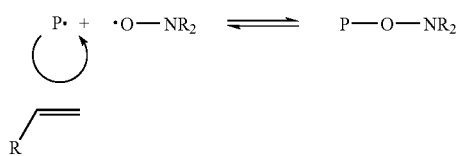

Early NMP methods described by Solomon, et al (U.S. Pat. No. 4,581,429) report the use of alkoxyamines (i.e., $R_2NOX$) with labile O—X bonds for controlled free radical polymerization. The alkoxyamine functions as both a free radical initiator and a source of the nitroxide control agent. Georges, et al (U.S. Pat. No. 5,401,804) utilized free nitroxide control agents, such as TEMPO (i.e., 2,2,6,6-tetramethylpiperidinyl-1-oxy), to control free radical chain polymerization initiated by conventional free radical initiators. Nesvada, et al (U.S. Pat. No. 6,262,206) and Klaerner, et al (PCT WO 0053640) later demonstrated that nitroxides and alkoxyamines derived from reactions of nitrones with free radical sources also can be used. Vanhoorne, et al (United States Patent Application Serial No. 2002/0165331 A1) describes NMP methods based on nitroxides derived from reactions of nitric oxide (i.e., NO). The state of the art for NMP has been regularly and extensively reviewed (see Matyjaszewski, K. *Controlled Radical Polymerization*; ACS Symp. Series 685: Washington D.C., 1998).

Reversible Addition Fragmentation Transfer (RAFT)

Controlled polymerization by RAFT occurs via rapid chain transfer between growing polymer radicals and dormant polymer chains. After initiation, the control agent becomes part of the dormant polymer chain. The key mechanistic features of RAFT are illustrated in Scheme 2.

Scheme 2

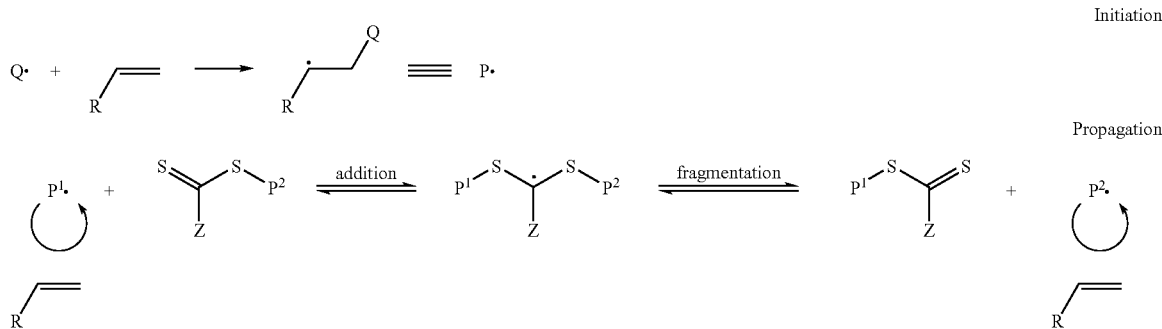

Rizzardo, et al (PCT WO 9801478 and Lai, et al (PCT WO 0160792) describe the use of trithiocarbonates (Z=SR) and dithioesters (Z=R) as control agents. Charmot, et al (WO 9858974) describe a similar process for macromolecular design via interchange of xanthates (MADIX: Z=OR). Charmot, et al (US Patent Application 2002/0065380) also describes the use of related dithioacylhydrazones (Z=NR (N=CR$_2$)) for controlled polymerization via what is likely to be a RAFT mechanism. The state of the art for RAFT has been regularly and extensively reviewed.

In RAFT polymerization an initiator produces a free radical that subsequently reacts with a polymerizable monomer. The monomer radical reacts with other monomers and propagates to form a chain, which can react with a control agent, such as a dithioester. The control agent can fragment, either forming R., which will react with another monomer that will form a new chain or which will continue to propagate. In theory, propagation will continue until no monomer is left and a termination step occurs. After the first polymerization has finished, in particular circumstances, a second monomer can be added to the system to form a block copolymer. Such a technique can also be used to synthesize multiblock, graft, star, gradient, and end-functional polymers.

Degenerative Transfer (DT)

In degenerative transfer, controlled polymerization occurs via direct exchange of an atom or group between propagating macroradical chains (i.e., P$^1$ and P$^2$). The control agent, which typically is an organyl halide with labile C—X bonds (e.g., n-C$_6$F$_{13}$I, α-bromo or iodoesters), provides the atom or group necessary for DT (i.e., X).

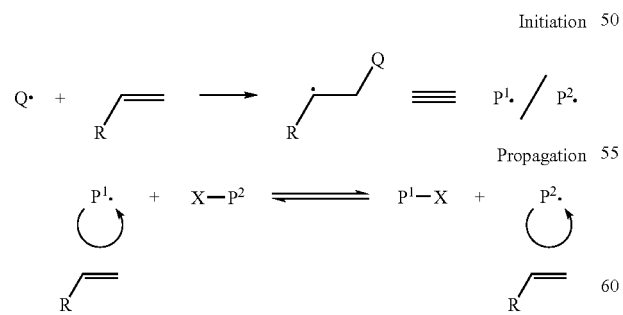

Matyjaszewski, et al (*Macromolecules*, 1995, 28, 2093 and *Macromolecules*, 1995, 28, 8051) describe the use of alkyl iodides for controlled radical polymerization by DT. Pouraii-mady, et al (EP Application 0947527) describe the use of activated organyl iodides for the formation of waterborne block copolymers via controlled polymerization. The use of perfluoroalkyl iodides for DT, including controlled polymerization in miniemulsion, has been described by Farcet, et al (*Macromol. Rapid. Commun.* 2000, 21, 921) and Apostolo, et al (*Macromolecules* 2002, 35, 6154).

Other Polymerization Reactions Involving Stable Free Radicals (SFR)

A common feature of controlled free radical polymerizations is the use of a control agent to introduce reaction pathways for reversible formation of dormant polymer chains from growing macroradicals. Under typical conditions, the equilibrium position of the reversible reaction is shifted strongly toward the dormant species, which lowers the concentration of macroradicals to the point where the rate of termination by bimolecular reactions (for example, radical combination) is negligible compared to the rate of propagation. Controlled polymerization by ATRP, RAFT, NMP and DT have been studied extensively, and detailed mechanisms have been proposed for these systems. In other cases, reaction mechanisms are not well established, but it is clear that addition of specific reagents facilitates reversible formation of stable free radicals and leads to behavior characteristic of controlled free radical polymerization.

One such reagent is 1,1-diphenylethylene (DPE), which has been described by Raether, et al (WO 0144327, WO 0039169 and WO 0037507) as an additive that enables control of free radical polymerization. As measured by polymer polydispersity, the degree of control for DPE-controlled polymerization is less than what is seen with other controlled free radical processes. However, the DPE method offers practical advantages over other methods for controlled free radical polymerization. Raether, et al (*Macromol. Symp.* 2002, 177, 25) reports the use of DPE to produce block copolymers on an industrial scale and proposes three mechanisms to rationalize control with DPE.

Anionic Polymerization

Living anionic polymerization is "controlled" polymerization, and the key mechanistic features, shown in Scheme 3, are discussed in many books (see Hsieh, H. L.; Quirk, R. P. *Anionic Polymerization: Principles and Practical Applications*; Marcel Dekker: New York, 1996) and review articles (see Hadjichristidis, N.; Pitsikalis, M.; Pispas, S.; Iatrou, H.; *Chem. Rev.* 2001, 101(12), 3747-3792). The initiator reacts with monomer to produce an anionic intermediate, which is capable of reacting with additional monomer to produce a growing polymer chain. The control agent normally is a cationic species generated in-situ. Although the structures of these species often are not known, their presence is required for electrical neutrality, and their compositions can have profound effects on the course of polymerization.

Scheme 3

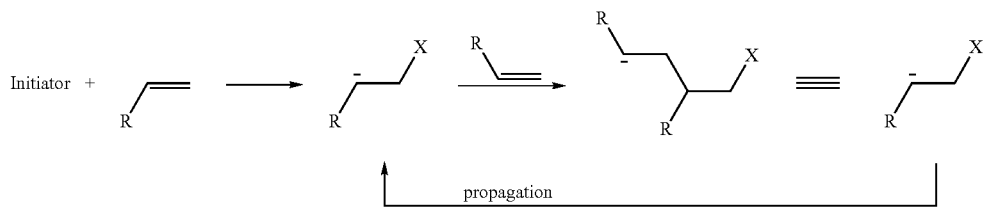

Living anionic polymerization is a versatile method for producing block copolymers, and it has been used with a wide range of monomers, including styrenes, acrylates, epoxides, lactones, siloxanes, conjugated dienes, and the like. Because water has a serious negative effect on most living anionic polymerizations, it seemed unlikely for many years that anionic polymerization could be performed in aqueous media. However, recent reports of anionic polymerization in miniemulsion (Rehor, et al *Macromolecules*, 2002, 35, 8688; Barrere, et al *Polymer*, 2001, 42, 7239; *Macromolecules*, 2001, 34, 7276; Maitre, et al *Macromolecules*, 2000, 33, 7730; Limouzin, et al *Macromolecules*, 2003, 36, 667) prove otherwise, and it now is reasonable to expect controlled anionic polymerization in emulsion.

Cationic Polymerization

Controlled cationic polymerization has many mechanistic similarities to controlled free radical polymerization by ATRP because most polymer chains are dormant at any given time. Initiation produces a cationic intermediate that is capable of reacting with additional monomer to produce a growing polymer chain. In competition with propagation is reversible addition of the control agent (i.e., Z-), which often is an anionic species generated in-situ. The equilibrium between reactive cationic polymer chains and dormant chains maintains a low concentration of reactive chains and thus effectively minimizes side reactions (e.g., termination). The key mechanistic features of controlled cationic polymerization are illustrated in Scheme 4.

As is the case for anionic polymerization, water has serious negative effects on most cationic chain polymerizations, and it seemed unlikely for many years that cationic chain polymerization could be performed in aqueous media. However, recent reports of "living" cationic polymerization in both aqueous solution and miniemulsion (Satoh, et al *Macromolecules*, 2001, 34, 396; *Macromolecules*, 2000, 33, 5836; *Macromolecules*, 2000, 33, 4660; *Macromolecules*, 2000, 33, 5830; *Macromolecules*, 2000, 33, 5405) prove otherwise.

Coordination Polymerization

Alkene polymerization is one of the most important catalytic reactions in commercial use, and it most often is accomplished via coordination polymerization. There are numerous ways to initiate coordination polymerization, but all methods eventually produce an intermediate that is capable of inserting olefin into a covalent bond between the control agent and the growing polymer chain. The key chain growth step in ethylene polymerization via the metal-catalyzed Cossee mechanism is illustrated in Scheme 5. This classical mechanism for coordination polymerization of olefins and acetylenes have been discussed in many books (see: Chien, *Coordination Polymerization*, Academic Press: New York, 1975), and developments in the field are reviewed regularly. (See: Ittel, et al *Chem. Rev.* 2000, 100, 1169).

Scheme 4

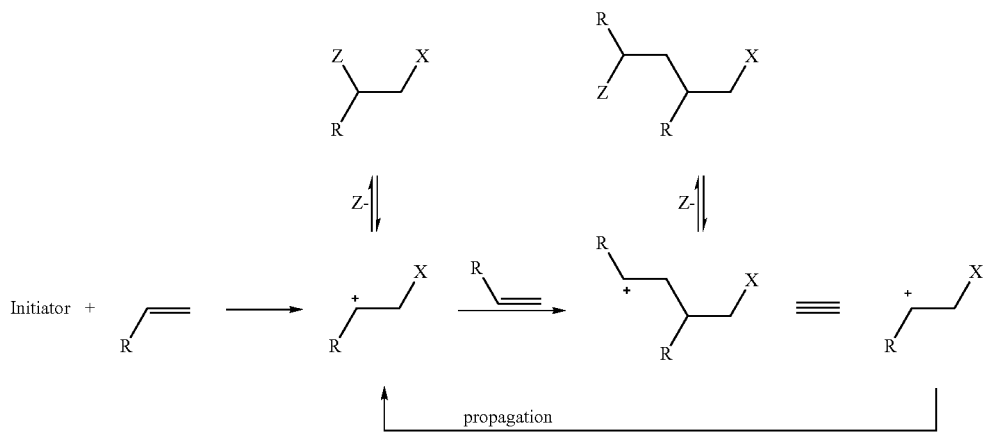

Scheme 5

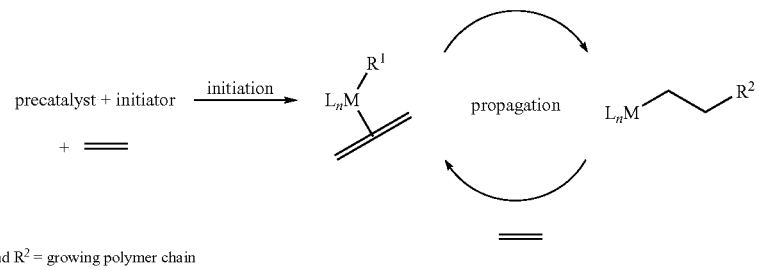

R[1] and R[2] = growing polymer chain

In addition to the Cossee mechanism, several other mechanisms have been identified for coordination polymerization. For example, the Rooney-Green mechanism involves the formation of metallacyclobutanes (see Turner and Schrock, *J. Am. Chem. Soc.*, 1982, 104, 2331), and coordination polymerization of conjugated dienes is believed to proceed via pi-allyl complexes.

Coordination polymerization can be accomplished under a wide range of conditions, including aqueous emulsion and circumstances where controlled polymerization is favorable. Recent articles by Coates, et al (*Angew. Chem., Int. Ed.* 2002, 41, 2236) and Gottfried, et al (*Macromolecules* 2003, 36, 3085) describe controlled coordination polymerization of olefins. Controlled copolymerization of alpha-olefins and carbon monoxide are described by Yi-Chun Chen, et al (*Organometallics* 2001, 20, 1285-1286 and references therein). Recent articles by Bauers, et al (*Angew. Chem., Int. Ed. Engl.* 2002, 41, 545; Macromolecules 2003, 36, 6711) and Claverie, et al (*Prog. Polym. Sci.* 2003, 28, 619) review developments in the field of aqueous coordination polymerization.

Ring Opening Metathesis Polymerization (ROMP)

Olefin metathesis is a versatile method for exchanging alkylidene groups between different alkenes. The exchange reaction is catalyzed by a variety of metal alkylidene complexes (i.e., M=CR$_2$), and its mechanism is well established. When applied to cyclic strained olefins, olefin metathesis can lead to ring-opening and controlled chain growth of polymers with the characteristics of classic "living" polymerization. The accepted mechanism for ROMP is illustrated in Scheme 6.

The control agent for ROMP is a metal alkylidene catalyst, which can be added directly to the monomer or generated in-situ from a metal-containing precatalyst. When a preformed metal alkylidene catalyst (for example, M=CR$_2$) is used, ROMP initiates spontaneously. When preformed catalysts are not used, the active catalysts must be generated in-situ via reactions of metal-containing precatalysts with appropriate initiators.

The most versatile catalysts for ROMP are based on group 8 transition metal alkylidene complexes developed by Grubbs, et al (PCT Int. Appl. WO 0279127, PCT Int. Appl. WO 0220535, PCT Int. Appl. WO 0058322, PCT Int. Appl. WO 0056785, PCT Int. Appl. WO 9922865, PCT Int. Appl. WO 9842665, PCT Int. Appl. WO 9842665, PCT Int. Appl. WO 9821214, PCT Int. Appl. WO 9842665, PCT Int. Appl. WO 9706185, PCT Int. Appl. WO 9604289). The state of the art in ROMP has been regularly and extensively reviewed. (see Claverie, *Prog. Polym. Sci.* 2003, 28, 619; Grubbs, et al, *Acc. Chem. Res.* 2001, 34, 18.) Efforts to develop emulsion ROMP systems also have been described in the literature (see Lynn, et al, *J. Am. Chem. Soc.* 2000, 122, 6601; Love, et al, *J. Am. Chem. Soc.* 2003, 125, 10103; Trnka, et al, *J. Am. Chem. Soc.* 2003, 125, 2546; Choi, et al, *Angew. Chem. Int. Ed. Engl.* 2003, 42, 1743).

Acyclic Diene Metathesis (ADMET) Polymerization

ADMET has many mechanistic similarities to ROMP, and many ROMP catalysts can be used for ADMET. Like ROMP, the chemical reaction responsible for ADMET polymerization is olefin metathesis catalyzed by metal alkylidenes. In contrast to ROMP, which involves chain polymerization of Scheme 6

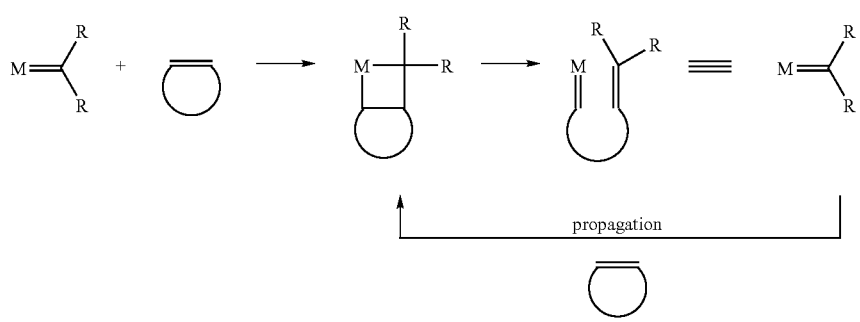

cyclic monomers, ADMET occurs via step polymerization of linear monomers. The key mechanistic features of ADMET are illustrated in Scheme 7.

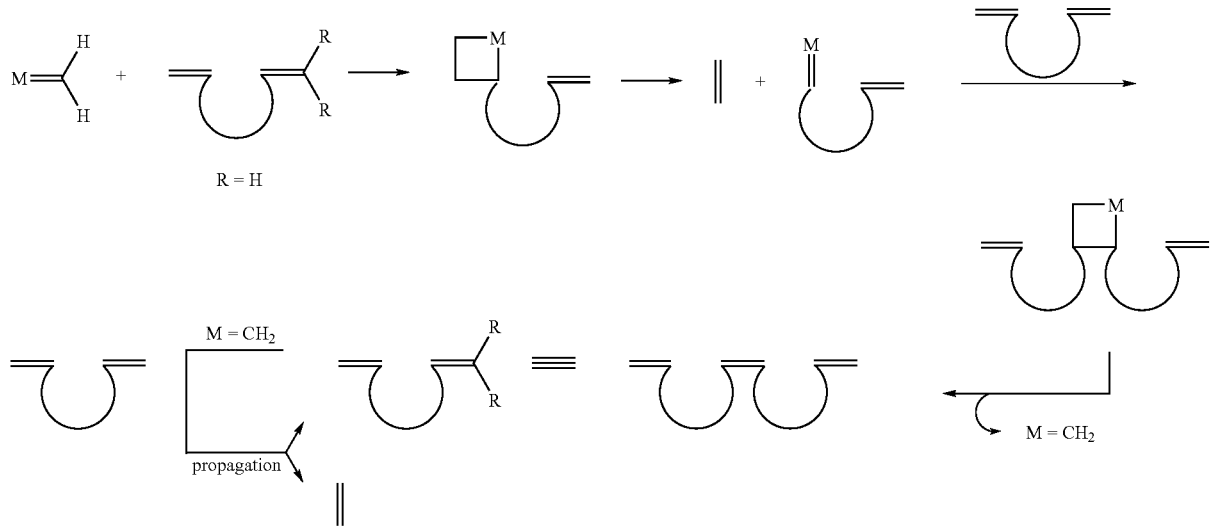

Scheme 7

Generally, ADMET polymerization is less attractive than ROMP because one molecule of a small olefin (e.g., ethylene) is produced for each monomer consumed. This and other aspects of ADMET are discussed in recent publications (see Courchay, et al, *Macromolecules* 2003, 36, 8231, and references therein).

Organotellurium-Mediated Living Radical Polymerization (TERP)

TERP has recently appeared as the newest class of controlled radical polymerization.

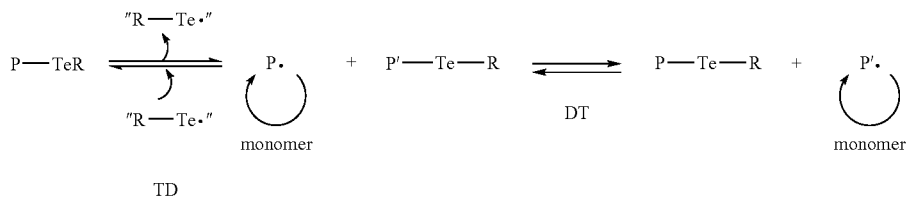

This system exhibits some unique features in terms of versatility, molecular weight controllability, functional group compatibility and ease of polymer-end group transformation. Unlike the ATRP, NMP, and RAFT controlled radical systems, TERP can proceed via two competing pathways; thermal dissociation (TD) and degenerative chain transfer (DT).

Yamago, et al describe the general mechanism and utility of the TERP system in a series of articles (*J. Am. Chem. Soc.* 2002, 124, 2874; *J. Am. Chem. Soc.* 2002, 124, 13666; *J. Am. Chem. Soc.* 2003, 125, 8720; and *Macromolecules* 2003, 36, 3793).

Control Agents

Controlled polymerization requires the presence of an agent to control the course of polymerization while minimizing undesirable side reactions, such as chain termination. These agents are called "control agents", and their characteristics depend greatly on the details of the polymerization, including the mechanism for polymerization, the types of monomers being used, the type of initiation, the solvent system, and the reaction conditions. Many different types of control agents have been investigated. Such control agents are species that maintain a dynamic equilibrium between reactive (living) polymer chains and dormant chains. In some embodiments of this invention, the control agent may be a control agent for polymerization by a free radical mechanism, such as ATRP, NMP, DT, RAFF or a related mechanism involving stable free radicals. In other embodiments, the control agent may be a control agent for polymerization by an ionic mechanism, such cationic or anionic polymerization. For controlled polymerization by ROMP or ADMET, the control agent is a catalyst for olefin metathesis. In the case of controlled coordination polymerization, the control agent catalyzes chain growth via insertion of monomer within the coordination sphere of the control agent.

The control agent may be introduced into the emulsion system by many different methods, and the preferred method depends greatly on the particular embodiment being practiced. In some embodiments, the active control agent may be added directly to the reaction vessel in the form of a pure compound or as a component of a solution or mixture. In other embodiments, the active control agent may be generated in-situ from chemical reactions occurring prior to, during or after emulsification.

Regardless of the method used to introduce or generate a control agent, the control agents suitable for the present invention offer one or more of the benefits associated with "living" polymerization kinetics. These benefits may include: (1) a linear dependence of the degree of polymerization as a function of time; (2) a linear dependence of the number-average molecular weight ($M_n$) on the extent of polymerization; (3) a constant number of polymer molecules and active centers that is sensibly independent of conversion; (4) a narrow molecular weight distribution, with $M_w/M_n$ generally less than 4, preferably between 1.1 and 2.0, and often below 1.5; (5) essentially complete conversion of monomer to polymer with the ability to continue polymerization upon addition of more monomer; (6) the ability to make block copolymers by sequential monomer addition; and/or (7) the ability to produce chain-end functionalized polymers in high yield.

Initiators

All polymerization reactions must be initiated. For some monomers, such as styrene, for example, thermal self-initiation can occur without the need for additional reagents. For many other monomers, initiation may be accomplished by adding an agent to trigger one or more chemical reactions that ultimately produces an intermediate capable of propagating polymerization. These agents often are referred to as "initiators."

The type of initiators suitable for the present invention depend greatly on the details of the polymerization, including the mechanism for polymerization, the types of monomers being used, the type of control agent, the solvent system and the reaction conditions. Many different types of initiators have been investigated.

In some embodiments of this invention, the initiator may be an initiator for polymerization by a free radical mechanism, such as ATRP, NMP, DT, RAFT or a related mechanism involving stable free radicals. Typically, suitable initiators for free radical polymerization are reagents or combinations of reagents that are capable of producing free radicals. Other methods for producing free radicals, including exposure to ionizing radiation (electron beam, X-ray radiation, gamma-ray radiation, and the like), photochemical reactions, and sonication, will be evident to those of skill in the art as suitable methods for initiating free radical polymerization.

In some embodiments, the initiator may be an initiator for polymerization by an ionic mechanism, such cationic or anionic polymerization. For controlled polymerization by ROMP or ADMET, the initiator may be a reagent for producing metal-alkylidene catalysts for olefin metathesis. In the case of controlled coordination polymerization, the initiator typically reacts with a metal-containing precatalyst to produce an active catalyst for polymer growth via insertion of monomer within the coordination sphere of the metal.

In some embodiments of this invention, the initiator can be a compound that also serves as a source of the control agent. In the case of NMP, for example, the initiator may be an initiator-control agent adduct characterized by Formula I:

Formula I wherein $R^1$ and $R^2$ are independently selected from the group consisting of alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl and combinations thereof; and optionally, $R^1$ and $R^2$ are joined together in a ring structure. In this context, Y is an atom or group of atoms capable of initiating free radical polymerization upon homolytic cleavage of the Y—O bond. Suitable Y groups include, for example, alkyl, substituted alkyl, alkoxy, substituted alkoxy, cycloalkyl, substituted cycloalkyl, heteroalkyl, heterocycloalkyl, substituted heterocycloalkyl, aryl, substituted aryl, heteroaryl, and substituted heteroaryl substituents. When the initiator is a compound with Formula I, the ratio of control agent to initiator can be adjusted by the addition of extra free radicals or control agent from other sources, including other chemical reactions.

In some embodiments of this invention, initiation can be achieved via chemical reaction of monomer with a precatalyst that provides control agent for the process. In the case of coordination polymerization, for example, preformed metal-alkyl and metal-hydride complexes may initiate polymerization immediately upon contact with monomer. Spontaneous initiation of polymerization may also occur in the case of ROMP or ADMET when, for example, the control agent is introduced in the form of an active catalyst for olefin metathesis.

The initiator may be introduced into the emulsion system by many different methods, and the preferred method depends greatly on the particular embodiment being practiced. In some embodiments, initiator may be present in either the aqueous phase or the organic phase prior to emulsificiation. In other embodiments, the initiator may be added to the reaction vessel after emulsification or the initiator may be generated in-situ from one or more chemical reactions occurring before, during or after the emulsification process. In some embodiments, the initiator may be added in two or more increments at different times during the polymerization. Initiation of polymerization can occur before, during, or after the emulsification procedure.

Macro-Initiators and Macro-Control Agents

The present invention is broadly applicable for controlled polymerization in aqueous emulsion. In some embodiments, it is preferable to produce polymer only from low molecular weight ingredients. Styrene polymerization via NMP, for example, can be achieved with formula weights below 400. In other embodiments, the initiator, the control agent or both may originate from compounds or mixtures of compounds with much higher formula weights. The term "macro-initiator" is used herein to describe higher formula weight initiators, and the term "macro-control agent" is used herein to describe higher formula weight control agents.

Numerous prior art methods have been described for preparing compounds or substances that would be suitable as macro-initiators or macro-control agents for the present invention. Known methods include, for example: (i) grafting of initiator or control agent functionality onto preformed polymers; (ii) stoichiometric termination of a solution polymerization reaction with a reagent that introduces end-groups capable of initiating or controlling polymerization by another mechanism; and (iii) solution synthesis of stable "living" polymers or oligomers for subsequent use as "seeds" for other controlled polymerization processes. These and other methods for producing copolymers via controlled polymerization have been reviewed by Davis and Matyjaszewski (*Adv. Polym. Sci.* 2002, 159, 1-168) for free radical polymerization and by Grubbs (*Aq. Phase Organometal. Catal.* 1998, p 466-76) for ROMP.

Surface-modified particles containing chemisorbed initiators or control agents for polymerization also are suitable as macro-initiators and macro-control agents for use with the present invention provided that the particles do not interfere with the emulsification procedure. The use of functionalized silica and gold particles to initiate controlled polymerization from a surface is well known. Other embodiments will be evident to those skilled in the art.

Promoters, Inhibitors and Other Additives

The term "promoter" is used herein to describe in a general sense a substance that, when added in relatively small amounts to a polymerization system, imparts greater activity, improved selectivity or better stability. The term "inhibitor" is used herein to describe in a general sense a substance that, when added in relatively small amounts to a polymerization system, leads to decreased activity. For particular embodiments of the present invention, the addition of optional promoters or inhibitors may provide practical advantages, including for example better control over initiation, more favorable reaction times, extended catalyst lifetimes and enhanced selectivity. The addition of other optional substances, including for example buffering ingredients, cosurfactants and antifreeze, may offer further advantages.

In the case of polymerization by NMP, for example, small amounts of certain acids can dramatically accelerate the rate of polymerization (see Hawker, et al *Tetrahedron* 1997, 53, 15225). These and related acids are promoters for NMP. Acid also is known to promote ROMP (see: Grubbs, et al *J. Am. Chem. Soc.* 2000, 122, 6601). In the case of coordination polymerization and ROMP, added ligands can moderate the rate of propagation by competing for coordination sites on the control agent or decreasing the steady-state concentration of coordinately unsaturated intermediates. (See: Grubbs, et al *Acc. Chem. Res.* 2001, 34, 18; and Chien, *Coordination Polymerization*, Academic Press, NY, 1975).

Monomers

Monomers that may be polymerized using the methods of this invention (and from which M may be derived) include at least one monomer selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, isoprene, 1,3-butadiene, ethylene, vinyl acetate, vinyl chloride, vinylidene chloride, oxidants, lactones, lactams, cyclic anhydrides, cyclic siloxanes and combinations thereof. Functionalized versions of these monomers may also be used. Specific monomers or comonomers that may be used in this invention and from which M is derivable include methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, α-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), α-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, chloroprene, ethylene, vinyl acetate, vinyl chloride, vinylidene chloride, 2-(2-oxo-1-imidazolidinyl)ethyl 2-methyl-2-propenoate, 1-[2-[2-hydroxy-3-(2-propyl)propyl]amino]ethyl]-2-imidazolidinone, N-vinyl pyrrolidone, N-vinyl imidazole, crotonic acid, vinyl sulfonic acid, and combinations thereof.

Some representative monomers than can be used in ROMP polymerization include norborene, norbornadiene, cyclopentene, dicyclopentadiene cycloheptene, cyclo-octene, 7-oxanorbornene, 7-oxanorbornadiene, and cyclododecene. Monomers that can be utilized in ADMET polymerization are typically non-conjugated α,ω-dienes, such as 1,9-decadiene. Such non-conjugated α,ω-dienes will normally contain from 5 to about 20 carbon atoms.

Surfactants, Latent Surfactants and Surfactant Activators

Surfactants are essential for the present invention, and suitable surfactants include any compound or mixture of compounds capable of stabilizing colloidal aqueous emulsions. Generally, surfactants are amphiphilic molecules that reduce the surface tension of liquids, or reduce interfacial tension between two liquids or a liquid and a solid. Surfactants may be small molecules or polymers, micelle-forming or non-micelle-forming, and may be anionic, cationic, zwitterionic or nonionic. In some embodiments of the present invention, mixtures of surfactants are used. The amount of surfactant used typically ranges from about 0.01 to about 200% by weight relative to the monomer, with a more preferred range being from about 0.1 to about 8% by weight and a more specifically preferred range being from about 0.5 to about 3% by weight. Those skilled in the art typically consider a number of factors when selecting surfactants for a particular application, including economic factors.

A broad range of suitable surfactants is described in McCutcheon's Emulsifiers & Detergents Handbook (McCutcheon Division, Manufacturing Confectioner Publishing Co, Glen Rock, N.J., 1999). Suitable anionic surfactants include substituted or unsubstituted hydrocarbyl sulfates, sulfonates, carboxylates, phosphonates and phosphates having between 6 and 30 carbon atoms per anionic functional group. Suitable cationic surfactants include substituted or unsubstituted hydrocarbyl ammonium salts having between 6 and 30 carbon atoms per cationic functional group. Suitable nonionic surfactants include amphiphilic amides having between 6 and 30 carbon atoms for each hydrocarboyl group and between 2 and 30 carbon atoms for each hydrocarbyl amine group. For each surfactant, one or more hydrogen or carbon atom from the hydrocarbyl groups may have replaced with another atom selected from the group consisting of N, S, O, Si, F, Cl, Br and I. The hydrocarbyl may also have one or more hydrogen or carbon atom replaced with a functionality such as a keto, ester, amide, ether, thioether, hydroxyl and the like, and the hydrocarbyl may be part of a ring structure.

In some embodiments, useful surfactants include, for example, alkali metal and ammonium salts of: (i) alkylsulfates (alkyl radical: $C_8$ to $C_{18}$); (ii) alkylarylsulfonic acids (alkyl radical: $C_9$ to $C_{18}$); (iii) alkanesulfonic acids (alkyl radical: $C_8$ to $C_{18}$); (iv) succinate half-amides of alkylamines (alkyl radical: $C_8$ to $C_{18}$); (v) succinate half-esters of alkanols (alkyl radical: $C_8$ to $C_{18}$); (vi) alkanoic acids (alkyl radical: $C_8$ to $C_{18}$); (vii) alkylphosphates (alkyl radical: $C_1$ to $C_{18}$); (viii) alkylphosphonates (alkyl radical: $C_1$ to $C_{18}$); (ix) acylated sarcosine and taurine (acyl radical $C_8$ to $C_{18}$); and (x) sulfosuccinic acid diesters and diamides (alkyl radical: $C_4$ to $C_{18}$). In other embodiments, useful surfactant include, for example: (i) alkanol amides (alkyl radical: $C_2$ to $C_{18}$); (ii) quaternized amines (alkyl radical: $C_1$ to $C_{18}$), including amine oxide derivatives; (iii) quaternized nitrogen-containing heterocycles with pendant alkyls (alkyl radical: $C_4$ to $C_{18}$); (iv) betaine derivatives (alkyl radical: $C_8$ to $C_{18}$); and (v) amphiphilic block copolymers.

An important aspect of the present invention is in-situ emulsification, which is achieved by reacting a "latent surfactant" with a "surfactant activator" to produce the surfactant for controlled emulsion polymerization. As used herein, the term "latent surfactant" refers to a compound or mixture of compounds that: (i) is soluble in a monomer-containing solution that is not miscible with water; and (ii) is not independently capable of producing a stabilized colloidal microemulsion at conventional surfactant levels from simple gentle mixing of the compound or mixture of compounds with monomer-containing solution and water. The term "surfactant activator" is used herein to describe a compound or mixture of compounds that: (i) is soluble in water; and (ii) is not independently capable of producing a stabilized colloidal microemulsion at conventional surfactant levels from simple gentle mixing of the compound or mixture of compounds with monomer-containing solution and water. For the present invention, water can be a reactant for in-situ emulsification reactions, but water alone cannot be the surfactant activator. In any case, the emulsifier is synthesized by reacting the "latent surfactant" with the "surfactant activator" within the aqueous medium (in-situ within the aqueous polymerization medium).

The fundamental principles for in-situ microemulsification are described by Prokopov and Gritskova (*Russ. Chem. Rev.* 2001, 70, 791), who review its use in conventional free radical polymerization of styrene using alkali-metal soaps prepared in-situ via neutralization of fatty acids. As explained by Prokopov and Gritskova, the preparation of a carboxylate soap at a styrene-water interface during emulsification can produce a fine microemulsion because interfacial tension is decreased significantly by an abundance of emulsifier produced at the interface. By varying the nature of the carboxylic acid and the metal counter-ion used in the surfactant synthesis at the interface, it was possible to control the degree of dispersion and stability of the emulsion, as well as the resulting polystyrene latex produced via conventional free radical polymerization. In the present invention, the principles of in-situ microemulsification are expanded broadly to produce emulsions suitable for controlled polymerization via a wide range of methods utilizing conventional soap levels without added hydrophobes or specialized emulsification equipment.

In some embodiments, the surfactant for controlled polymerization may be produced by an acid/base neutralization reaction at the monomer/water interface. For some types of anionic surfactants, this may be accomplished, for example, via reaction of a monomer-soluble acid with an aqueous base, where the monomer-soluble acid is the latent surfactant and the base is the surfactant activator for in-situ emulsification. Suitable monomer-soluble acids include, for example, palmitic acid, oleic acid, dodecylbenzene sulfonic acid, lauryl sulfate, hexadecylsulfonic acid, dihexadecylphosphonic acid, hexadecylsuccinate half ester, and the monohexadecylamide of succinic acid. Suitable bases include, for example, hydroxides, carbonates and bicarbonates of alkali metal ions and quaternary ammonium ions, substituted and unsubstituted amines, and basic nitrogen-containing heterocycles. It will be evident to those skilled in the art that any aqueous base with a $pK_b$ less than about the $pK_a$ of the monomer-soluble acid also may be suitable. It also will be evident that hydroxides generated in-situ via hydrolysis of moisture-sensitive compounds, such as sodium methoxide, sodium amide, potassium hydride and the like, also may be suitable as surfactant activators.

For some types of cationic surfactants, in-situ synthesis during emulsification may be accomplished, for example, via reaction of a monomer-soluble base with an aqueous acid, where the monomer-soluble base is the latent surfactant and the acid is the surfactant activator. Suitable monomer-soluble bases include, for example, hexadecyldimethylamine, hexadecyldimethylamine oxide, and amphiphilic nitrogen-containing heterocycles. Suitable acids include for example mineral acids, sulfonic acids and phosphonic acids. It will be evident to those skilled in the art that any aqueous acid with a $pK_a$ less than about the $pK_b$ of the monomer-soluble base also may be suitable. It also will be evident that acids generated in-situ via hydrolysis of moisture-sensitive compounds, such as Lewis acids, acyl halides, acyl anhydrides, mineral acid anhydrides, hydrolyzable transition-metal halides, main group halides and the like, also may be suitable as surfactant activators.

In some embodiments, surfactant may be produced in-situ by chemical reactions that attach hydrophilic functionality to a functionalized hydrophobe. For these embodiments, the functionalized hydrophobe is the latent surfactant and the reagent or reagents necessary for attaching the hydrophilic functionality serve as surfactant activator. For some types of surfactants, this may be accomplished, for example, via reaction of a monomer-soluble electrophile with an aqueous nucleophile. Suitable electrophiles include for example: (i) hydrocarboyl halides; (ii) hydrocarboyl esters; (iii) hydrocarboyl anhydrides; (iv) hydrocarbyl isocyanates; (v) hydrocarbyl halides; and (vi) hydrocarbyl esters of sulfonic acids. Suitable surfactant activators include for example: (i) aminefunctionalized hydrocarbylsulfates, hydrocarbylcarboxylates, hydrocarbylphosphates, hydrocarbylammonium salts; (ii) diethanol amine; (iii) diethylenetriamine and other aminoamines; (iv) amino-polyethyleneglycols and polyethyleneglycol ethers; (v) aminoglycosides; (vi) aminobetaines; (vii) hydroxides of alkali metal ions and quaternary ammonium ions; (viii) hydrocarbylamines.

For some types of surfactants, in-situ synthesis and emulsification may be accomplished by reaction of a monomer-soluble nucleophile with an aqueous electrophile. Suitable nucleophiles include for example, hexadecylamine and hexadecyldimethylamine. Suitable electrophiles include for example succinic anhydride, dimethylsulfate and 1,3-propanesultone.

Many other reactions can be used to synthesize surfactants in-situ, and the specific embodiments illustrated above are not intended to preclude any combination of latent surfactant/surfactant activator that produces a surfactant during emulsification. It will be evident to those skilled in the art that other latent surfactant/surfactant activator combinations may be suitable when the chemistries of surfactant synthesis and controlled polymerization are compatible.

Polymerization Systems

The polymerization systems of this invention are combinations or mixtures of components, which include water, surfactant, control agent and at least one monomer. The addition of an initiator to the polymerization system is optional, but typically preferred for the embodiments of this invention. The surfactant is synthesized in-situ during emulsification, which typically is performed by mixing a solution containing latent surfactant and at least one monomer with an aqueous solution of surfactant activator. Control agent, initiator, promoter and inhibitor may be present in either or both solutions before mixing, or they may be generated in-situ during emulsification, or they may be added after emulsification. The polymerization system is subjected to polymerization conditions to effect polymerization of at least one monomer. For random copolymers or higher order interpolymers, two or more monomers may be added to the polymerization system at the same time. For block copolymers, the monomers are typically added in a desired sequence in order to grow the desired block. For the emulsion polymerization systems, the polymerization system is considered to be the starting components, which are subjected to the polymerization conditions. The products of such polymerization systems are the emulsions themselves or the polymers, after isolation or drying.

The ratios of components (e.g., initiators, surfactants, monomers, control agents, etc.) in the polymerization system may be important and can vary widely depending on the particular embodiment being practiced. The ratio of monomer to control agent can be used to determine the molecular weight of polymers produced using the controlled emulsion polymerization processes of this invention. According to these processes, the number average molecular weight of the resulting polymers depends linearly on the number of polymer chains in the polymerization and the mass of monomer. Assuming every growing chain contains one residue derived from the control agent, the selection of a monomer to control agent ratio provides an opportunity to control in advance the polymer molecular weight (or degree of polymerization). Typically, however, the actual molecular weight differs from the predicted molecular weight by a relatively constant percentage, and this difference should be taken into account when targeting a product with a desired molecular weight. In typical embodiments, the monomer to control agent ratio may be in the range from about 10:1 to about 10,000:1, more preferably in the range from about 50:1 to about 10,000:1 and most preferably in the range from about 100:1 to about 5000:1.

Another ratio that may be important is the ratio of equivalents of initiator to control agent. For many controlled polymerizations, including for example ROMP, NMP, cationic and anionic polymerization, the number of polymer chains initiated should equal, in principle, the number of control agent molecules. For controlled polymerization via transfer mechanisms, including for example RAFT, DT and ATRP, only catalytic amounts of initiator are required, in principle, to achieve complete conversion. In practice, initiator efficiencies vary greatly and it often may be desirable to adjust the initiator to control agent ratio to achieve desirable results.

The surfactant to monomer ratio may be controlled and is typically in the range from about 0.0001:1 to about 2:1, more preferably in the range from about 0.001:1 to about 0.2:1, and most preferably in the range from about 0.01:1 to about 0.1:1. Once emulsions are formed by in-situ surfactant synthesis, the surfactant to monomer ratio may be adjusted further by adding additional surfactant, which may be the same surfactant or a different surfactant that is not necessarily synthesized in-situ.

The percent solids for emulsions may be in the range from about 0.01% to about 95% by weight. In some preferred applications, emulsions are produced with solids content of 40% by weight or greater. The useful solids content for other applications is from about 0.5% to about 40% by weight. The amount of water used in the polymerization is chosen according to the desired solids content of the aqueous polymer emulsion to be prepared.

Polymerization conditions include the ratio of components, system temperatures, pressure, type of atmosphere, reaction time and other conditions generally known to those of skill in the art. The polymerization temperature may be between about −40° C. and 250° C. For many embodiments, the polymerization temperature may be between about 0° C. and about 200° C., more preferably between about 25° C. and about 150° C., and most preferably between about 40° C. and about 110° C. In other preferred embodiments, the temperature of the polymerization system is controlled to a temperature of less than about 100° C., more preferably less than about 90° C., even more preferably less than about 80° C. and for some embodiments less than or about 70° C. Polymerization conditions also include a pressure between about ambient pressure up to about 200 atmospheres. The type of atmosphere above the emulsion may also be one of the polymerization conditions, and the atmosphere may be air, nitrogen, argon or another suitable atmosphere. Polymerization conditions also include the time for reaction, which may be from about 0.5 hours to about 72 hours, preferably in the range from about 1 hour to about 24 hours, and more preferably in the range from about 2 hours to about 12 hours.

Emulsion Systems

In the broadest sense, an emulsion polymerization is any heterogeneous polymerization in an aqueous environment. Typically, these systems produce particles of polymer as product. Those skilled in the art recognize many variants of these polymerizations, with typical classifications distinguishing between polymerizations occurring in true emulsions, micro emulsions, mini emulsions, suspensions and dispersions. These processes are generally distinguished by differences in process, components or results, with specific factors including the presence, amount and type of surfactant required; presence, amount and type of initiator; type and amount of monomer, including monomer solubility; polymerization kinetics; temperature; order of addition of the components, including the timing of addition of the components (e.g., monomer); solubility of the polymeric product; agitation; presence of cosolvents or hydrophobes; resulting particle size; particle stability in the polymerization system toward coagulation or sedimentation; and other factors known to those skilled in the art.

The systems of the invention may not fall completely into any of the traditional definitions typically applied by those skilled in the art (e.g., true emulsions vs. micro emulsions). These systems may fall between the traditional definitions, while having properties characteristic of one or many traditionally-classified systems. Accordingly, the polymerizations of the invention can be considered to encompass traditional (or true) emulsion polymerizations, micro and mini emulsions as well as suspension and dispersion polymerizations. Characteristics that can be used to distinguish these heterogeneous polymerization systems are set out in Table 2, below.

be obtained using the heterogeneous aqueous free radical polymerizations of the invention.

Desirable properties of large-particle emulsions include opacity, low viscosity, and ease of polymer isolation. Emulsions with uniform or broad particle size distribution can result from processes of the invention, with various advan-

TABLE 2

| Property | Traditional Emulsion | Mini Emulsion | Micro Emulsion | Suspension | Dispersion |
|---|---|---|---|---|---|
| Locus of polymerization | particles | droplets | particles | droplets | water |
| Distribution of Monomer | droplets/ particles | droplets | particles | droplets | droplets/ water |
| Distribution of polymer | particles | droplets | particles | droplets | particles |
| Aqueous solubility of monomer | Moderate to high | Low to moderate | Moderate | Low to moderate | high |
| Importance of agitation | Moderate to low | High (at start) | Low | High | high |
| Typical resulting particle size (nm) | 10-200 | 50 to 500 | 10-100 | 500 to 5000 | 500 to 5000 |
| Typical particle size distribution | Narrow | Broad | Narrow | Broad | Broad |
| Typical amount of surfactant relative to monomer | 0 to 5% | 0.1 to 10% | ~100% | 0 to 5% | 0 to 5% |
| Thermodynamic stability before polymerization | Not stable | Not stable | Stable | Not stable | Not stable |
| Typical maximum solids content | 50% | 20% | <10% | 40-50% | 40-50% |

Some of these ranges are subjective and extremes may often only be obtained in exceptional circumstances. Terms such as low, medium and high are subjective, and are intended to illustrate differences in the classifications known to those skilled in the art. The processes of the invention are distinguished as discussed herein.

One specifically preferred embodiment of the invention is a controlled heterogenous polymerization reaction in an emulsion characterized by particle sizes ranging from 10 to 150 nm, and preferably from 15 to 100 nm or from 20 to 70 nm in hydrodynamic radius. Polymerizations of this embodiment may have process parameters similar to those discussed above for "traditional" or "true" emulsion polymerizations. These emulsions are stable (on the order of many months with no observed coagulation or sedimentation, yet are prepared using surfactant in amounts less than 2% by weight to monomer. These emulsions feature a uniform distribution of particle sizes (nonuniformity of the polymer particle radius distribution—e.g., R. M. S. variation in average polymer particle radius of less than about 50%).

The controlled particle sizes that characterize the controlled polymer emulsions of some embodiments of the invention provide a number of benefits in many applications. The living nature of the polymerization processes of the invention allow for novel means for controlling particle size and distribution of the resulting polymer emulsions. Emulsions of smaller particles are generally very stable and have useful process advantages such as faster reaction kinetics and more scalable and reproducible preparations. Such emulsions have useful optical properties (e.g., lower turbidity), high viscosity, greater surface area and coalesce to form more uniform or thinner films, all of which may be advantageous in typical applications such as adhesives, dispersants, coatings and separation media. In other embodiments directed to different applications, larger particles may be desirable and can tages of particle size distribution known to those skilled in the art. For example, broad particle size distribution may result from properly chosen polymerization conditions, or may be obtained by blending particles of narrow size distribution obtained from several different polymerizations.

Unless otherwise specified, polydispersity index or PDI refers to the ratio of mean/median for a distribution, or more specifically for the case of molecular weight measurements, polydispersity index is known in the art as $M_w/M_n$, where $M_w$ is the weight average molecular weight and $M_n$ is the number average molecular weight of a polymer sample. Values of PDI in this specification range from 1.0 and higher, with values near 1.0 representing relatively monodisperse samples.

The use of nitroxide control agents under emulsion conditions offers other benefits associated with living kinetics (e.g., linear increase in molecular weight as a function of conversion). The controlled free radical emulsion polymerizations of the invention provide a high degree of control over molecular weight, especially at high molecular weight, (as high as >50,000, or even >100,000), often with narrow molecular weight distribution (polydispersity ($M_w/M_n$) generally less than 4 and preferably between 1.1 and 2.0, also below 1.5).

While typical particle sizes for uncontrolled radical emulsion polymerizations range from 50 nm to about 200 nm depending on the amount of monomer and surfactant, polymerizations of the invention have been shown to provide emulsions with smaller particle size, under similar condition of surfactant and monomer concentration. For example, uncontrolled emulsion polymerizations of styrene (1% surfactant, 20% solids and target Mw of 100,000) yield particle sizes that range from about 50 nm to about 75 nm radius. By contrast, the emulsion polymerization processes of this invention can readily produce emulsion polymers with particle sizes less than 40 nm.

In the emulsion polymerization process of this invention, the control agent in radical form is combined with water, surfactant, initiator (or initiating radical), at least one monomer and optionally an accelerator and/or a reagent to react with the control agent under polymerization conditions. Emulsion polymerization conditions include those discussed above, but most preferably are at a temperature below about 95° C.

Polymers, Including Block Copolymers

The methods of this invention may be practiced to form new polymers. In one preferred embodiment, a "living" oligomer or polymer of this invention may be described by Formula 1:

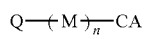

(Formula 1)

where Q is a residue derived from a species that initiates polymerization; M is one or more monomers (as discussed above); CA is a control-agent-derived residue capable of propagating controlled polymerization; and n is an integer greater than 1, preferably greater than 10 and also preferably greater than 100. For embodiments with polyfunctional initiators, the polymer may be described by Formula 2, where m1 represents the number of polymer chains initiated by each polyfunctional initiator. For embodiments with polyfunctional control agents, the polymer may be described by Formula 3, where m2 represents the number of polymer chains attached to the control-agent-derived residue.

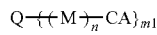

Formula 2

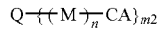

Formula 3

For embodiments with monomers that are capable of producing crosslinks during controlled polymerization—such as, for example, butadiene and divinylbenzene in the case of radical polymerization or dicyclopentadiene in the case of ROMP—Formulas 1-3 may be used to describe individual polymer molecules within the crosslinked polymer.

The polymers described by Formulas 1-3 show control-agent-derived residues attached to the polymer. These residues may be removed or modified as is known to those with skill in the art. Specific methods that may be used depend on the type of control-agent-derived residue, and may include for example cleavage of the residue from the polymer.

The "living" nature of the polymerization processes of this invention provide those of skill in the art the ability to create virtually any type of polymer architecture desired, as well as selection from a wide variety of monomers. Thus, this invention includes block copolymers derived from controlled copolymerization of two or more monomers. Some of these block copolymers are exemplified in the following examples. Although some of these types of block copolymers may have been prepared by other methods, this invention provides a controlled method for synthesis in emulsion with living type kinetics that leads to novel properties. Novel properties include higher molecular weights (e.g., $M_w$ above 50,000), better particle size control, lower surfactant levels for latex. Molecular weights for the polymer (or blocks, as discussed below, to achieve aggregate molecular weights) can be from 2,000 and higher, preferably 50,000 and higher, more preferably from 100,000 and higher. From these properties, other properties can be derived, as discussed elsewhere in this specification. For some applications, the polymers may be used in the heterogeneous medium in which they are created; in others, the polymers may be isolated from the emulsion. Polymers may be isolated using a variety of well-known techniques, including, for example, coating, drying, spray drying, coagulation (i.e., with salt, solvent, thermal cycling, shear, etc.), extraction with solvent, chemical modification of the polymer and the like, depending on the application.

Modifiers, stabilizers or other additives may be added to the polymers for particular applications, whether in emulsion or not, as is known to those of skill in the art.

As used herein, the term "block copolymer" refers to a polymer comprising at least two segments of differing composition; having any one of a number of different architectures, where the monomers are not incorporated into the polymer architecture in a solely statistical or uncontrolled manner. Although there may be three, four or more monomers in a single block-type polymer architecture, it will still be referred to herein as a block copolymer. In some embodiments, the block copolymer will have an A-B architecture (with "A" and "B" representing the monomers). Other architectures included within the definition of block copolymer include A-B-A, A-B-A-B, A-B-C, A-B-C-A, A-B-C-A-B, A-B-C-B, A-B-A-C (with "C" representing a third monomer), and other combinations that will be obvious to those of skill in the art.

In another embodiment, the block copolymers of this invention include one or more blocks of random copolymer together with one or more blocks of single monomers. Thus, a polymer architecture of A-R, R-R', A-R-B, A-B-R, A-R-B-R-C, etc. is included herein, where R is a random block of monomers A and B or of monomers B and C. Moreover, the random block can vary in composition or size with respect to the overall block copolymer. In some embodiments, for example, the random block R will account for between 5 and 80% by weight of the mass of the block copolymer. In other embodiments, the random block R will account for more or less of the mass of the block copolymer, depending on the application.

Furthermore, the random block may have a compositional gradient of one monomer to the other (e.g., A:B) that varies across the random block in an algorithmic fashion, with such algorithm being either linear having a desired slope, exponential having a desired exponent (such as a number from 0.1-5) or logarithmic. The random block may be subject to the same kinetic effects, such as composition drift, that would be present in any other corresponding uncontrolled copolymerization, and its composition and size may be affected by such kinetics, such as Markov kinetics. Any of the monomers listed elsewhere in this specification may be used in the block copolymers of this invention.

A "block" within the scope of the block copolymers of this invention typically comprises about 10 or more monomers of a single type (with the random blocks being defined by composition and/or weight percent, as described above). In preferred embodiments, the number of monomers within a single block may be about 15 or more, about 20 or more or about 50 or more. However, in an alternative embodiment, the block copolymers of this invention include blocks where a block is defined as two or more monomers that are not represented elsewhere in the copolymer. This definition is intended to encompass adding small amounts of a second monomer at one or both ends of a substantially homopolymeric polymer. In this alternative embodiment, the same copolymer architectures discussed above apply. This definition is therefore intended to include telechelic polymers, which include one or more functional end groups capable of reacting with other molecules. Thus, generally, a telechelic polymer is a block copolymer within the definitions of this invention. The functional groups present at one or both ends of a telechelic polymer may be those known to those of skill in the art, including, for example, hydroxide, aldehyde, carboxylic acid or carboxylate, halogen, amine and the like, which have the ability to associate or form bonds with another molecule. Likewise, the block copolymers of the invention are intended to encompass telechelic polymers containing bifunctional groups, such as allyl-terminated or vinyl-terminated telechelics, sometimes referred to as macromonomers or macromers because of their ability to participate in polymerization reactions through the terminal functional group.

Combining the above embodiments provides a particularly powerful method for designing block copolymers. For example, a block copolymer may have the architecture F-A-B-F, where F represents functional groups that may be the same or different within a single F-A-B-F structure (which, therefore, may encompass F-A-B-F'). Other block copolymer architectures within the scope of this invention include A-R-B-F and F-A-R-B-F. Other architectures will be apparent to those of skill in the art upon review of this specification. Indeed, without wishing to be bound by any particular theory, it is the living nature of the emulsions of this invention that provide the ability to even make these novel block copolymers.

In one embodiment, block copolymers are assembled by the sequential addition of different monomers or monomer mixtures to living polymerization reactions. In another embodiment, the addition of a pre-assembled functionalized block (such as a telechelic oligomer or polymer) to a living free radical polymerization mixture yields a block copolymer. Ideally, the growth of each block occurs with high conversion. Conversions are determined gravimetrically. Typical conversions can be 50% to 100% for each block. Intermediate conversion can lead to block copolymers with a random copolymer block separating the two or more homopolymer blocks, depending on the relative rates of polymerization and monomer addition. At high conversion, the size of this random block is sufficiently small such that it is less to affect polymer properties such as phase separation, thermal behavior and mechanical modulus. This fact can be intentionally exploited to improve polymerization times for some applications without measurably affecting the performance characteristics of the resulting polymer. Block copolymer also can be created by grafting monomers, monomer mixtures, oligomers or polymers having multiple available functional groups.

In other embodiments, block copolymers can be prepared by grafting processes, preparation of telechelic polymers, preparation of macromonomers, etc. In these embodiments, at least one polymer segment is derived from a living or controlled process of the invention, while other segments can be derived from any polymerization process, including, for example, controlled or uncontrolled radical polymerization, condensation polymerization, ionic polymerization, surface modification or grafting, or other addition or step-growth processes.

The combination of heterogeneous (and particularly emulsion) conditions with living-type polymerization kinetics provides a high degree of control over the composition, architecture, phase morphology and microstructure of polymers produced according to the invention. These methods may be practiced to form new polymers, including, for example, di-, tri-, poly-, multi-arm, star and graft block copolymers in addition to novel homopolymers. These methods also may be practiced to form a broad range of cross-linked polymer networks, interpenetrating polymer networks and polymer-modified surfaces, including polymer networks and polymer-modified surfaces with nanometer-scale dimensions.

Block copolymers allow the combination of potentially diverse polymer properties (such as hard/soft and/or hydrophilic/hydrophobic (amphiphilic) blocks) into a single polymer chain. Hard/soft block copolymers combine segments with significantly different glass transition temperatures, $T_g$. A typical hard/soft copolymer pairs a relatively "hard" block (e.g., styrene) with a relatively "soft" block (e.g., butyl acrylate). The resulting materials can possess performance attributes not found in any of the constituent segments. The presence of microphase separation and various phase morphologies in block copolymers is associated with unique performance attributes of many block copolymers. For example, by combining the stiffness or rigidity characteristic of hard materials with the compliance of soft materials, block copolymers may exhibit advantageous properties, such as processability under melt conditions, elasticity, resistance to abrasion and cracking and desired creep characteristics (corresponding to the material's ability to hold its shape under external stresses) depending on morphology, making them appropriate for use as extrudable bulk materials, coatings and separation media. The exact properties of a hard/soft copolymer depend significantly on the difference between the glass transition temperatures of the constituent blocks; accordingly, selection of monomers having glass transition temperatures a particular distance apart can lead to hard/soft block copolymers having particular desired characteristics. Thus, while for one application it may be appropriate to combine blocks having glass transition temperatures that differ by, for example, 20° C., the choice of $T_g$ (and therefore of materials) depends on the application. Monomers that can be combined to form hard and soft blocks are known in the art (see, for example, U.S. Pat. No. 5,755,540).

Likewise, the amphiphilic block copolymers produced according to the invention display combinations of hydrophobic and hydrophilic properties that make such materials appropriate for use as surfactants or dispersants, scavengers, surface treatments and the like. Different block sizes over all ratios of monomers and molecular weights lead to families of novel compounds, for example thermoplastics, elastomers, adhesives, and polymeric micelles.

The existence of a block copolymer according to this invention is determined by methods known to those of skill in the art. For example, those of skill in the art may consider nuclear magnetic resonance (NMR) studies of the block copolymer. Those of skill in the art also would consider the measured increase of molecular weight upon addition of a second monomer to chain-extend a living polymerization of a first monomer. Block copolymer structure can be suggested by observation of microphase separation, including long range order (determined by X-ray diffraction), microscopy and/or birefringence measurements. Other methods of determining the presence of a block copolymer include mechanical property measurements, (e.g., elasticity of hard/soft block copolymers), thermal analysis and chromatography (e.g., absence of homopolymer).

Measurement of optical properties, such as absorbance (color and clarity), provides information about the phase morphology and microstructure of the polymer emulsions. Thus, for example, birefringence measurements may indicate the presence of optical anisotropy resulting from microphase separation in hard/soft block copolymers of styrene and butyl acrylate. Likewise, sharp color delineations in optical micrographs of annealed polymer films can indicate the presence of ordered, microphase-separated block copolymer structure.

Block copolymers of sufficiently high molecular weight phase separate on a microscopic scale, to form periodically arranged microdomains which typically comprise predominantly one or the other polymer. These may take the form of lamellae, cylinders, spheres, and other more complex morphologies, and the domain sizes and periods are typically in the range 10-100 nm. Such microphase separation can be detected in a variety of ways, including electron microscopy, x-ray or neutron scattering or reflectivity, measurement of optical anisotropy, and rheological measurements. The absence of a periodic microstructure is not necessarily evidence against having synthesized a block copolymer, as such absence may be due to low molecular weight, weak intermolecular interactions, or inadequate time and slow kinetics for microphase separation. However, the presence of a periodic microstructure on the 10-100 nm scale is considered extremely compelling evidence for block copolymer formation in accord with this invention.

The novel properties of the copolymers and emulsions—including for example: (i) high molecular weight and relatively low polydispersity; (ii) controlled phase morphology and microstructure of copolymers; (iii) controllable particle size distributions; and (iv) high optical purity—make them suitable for a wide variety of applications, including adhesives, binders, coatings, dispersants, scavengers, rheology modifiers, bulk extrudable materials and health and personal care products. Thus, for example, pressure sensitive adhesives may be prepared using the emulsions or dispersions of this invention, with such adhesives including tackifiers and/or plasticizers, as known in the art (see, for example: U.S. Pat. No. 4,879,333, which is incorporated herein by reference).

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Surfactant Systems for In-Situ Emulsification in Styrene

A series of reactions were performed to identify latent surfactant/surfactant activator combinations for in-situ emulsification. In a typical reaction, solutions of latent surfactant (~0.2 grams) in styrene (5 milliliters) and surfactant activator in water (5 milliliters) were prepared. The aqueous solution was then added to the styrene solution with gentle stirring to generate an emulsion. Selected latent surfactant/surfactant activator combinations that produced an emulsion are summarized in the table below:

| Entry | Latent Surfactant | Surfactant Activator(s) |
|---|---|---|
| 1 | Palmitoyl Chloride | KOH |
| 2 | Palmitoyl Chloride | Diethanolamine/KOH |
| 3 | Palmitoyl Chloride | Glycine/KOH |
| 4 | Palmitoyl Chloride | 3-aminopropanephosphonic acid/KOH |
| 5 | Palmitoyl Chloride | 3-aminopropanesulphonic acid/KOH |
| 6 | Palmitoyl Chloride | (2-aminoethyl)trimethyl-ammoniumchloride hydrochloride/KOH |
| 7 | Hexadecylamine | Succinic anhydride |
| 8 | Hexadecylamine | 1,3-Propanesultone/KOH |
| 9 | Hexadecylamine | HCl |
| 10 | Hexadecylisocyanate | Diethanolamine/KOH |
| 11 | Hexadecylisocyanate | Glycine/KOH |
| 12 | Hexadecylisocyanate | (2-aminoethyl)trimethyl-ammoniumchloride hydrochloride/KOH |
| 13 | 4-Dodecylphenol | KOH |
| 14 | Dodecanol | Maleic anhydride/KOH |

Example 2

Polymerization of Controlled $M_n$ & PDI Polystyrene by RAFT

A 2-gallon reaction vessel was initially charged with 1,000 grams of styrene, 60.0 grams of oleic acid and 7.2 grams of dibenzyltrithiocarbonate. The reactor was then flushed with nitrogen, briefly evacuated and charged with an aqueous solution comprising 4,000 grams of RO water, 40.0 grams of potassium persulfate, 40.0 grams of tripotassium phosphate and 16.4 grams of potassium hydroxide. Immediately upon mixing the aqueous solution with the organic, a fine microemulsion forms. The mixture is then rapidly heated to 65°. Complete conversion to a stable, slightly yellow polystyrene latex is achieved in less than 1.5 hours. Solids after stripping were 20.6%. GPC analysis of the final polymer gave a $M_n$ of 54,000 with a PDI of 1.17.

Example 3

Polymerization of Controlled $M_n$ & PDI Polystyrene by RAFT Using an In-Situ Generated Polymerizable Surfactant A 2-gallon reaction vessel was initially charged with 1,000 grams of styrene, 60.0 grams of the hexadecyl half ester of maleic acid and 7.2 grams of dibenzyltrithiocarbonate. The reactor was then flushed with nitrogen, briefly evacuated and charged with an aqueous solution comprising 4,000 grams of reverse-osmosis (RO) water, 40.0 grams of potassium persulfate, 40.0 grams of tripotassium phosphate and 16.4 grams of potassium hydroxide. It should be noted that immediately upon mixing the aqueous solution with the organic, a fine microemulsion forms. The mixture is then rapidly heated to 65° C. Complete conversion to a stable, slightly yellow polystyrene latex is achieved in less than 3 hours. Solids after stripping were 23.7%. GPC analysis of the final polymer gave a $M_n$ of 48,000 with a PDI of 1.17.

Example 4

Preparation of Emulsion Triblock Copolymers From Seed Latex

Varying amounts of seed PS latex were charged into one quart heavy-walled polymerization "pop" bottles followed by the addition of RO water and varying amounts of either isoprene, butadiene or a 77/23 mixture of butadiene and styrene. The bottles were purged of air and capped with gasketed metal caps with holes punched through the metal portion to allow sampling of solids as the polymerization proceeds. The charges to the individual bottles are shown in the following table along with selected polymerization data. Clear latex cast films were easily prepared and demonstrated substantial strength and elastic recovery. SPM photomicrographs clearly show very small (ca. 80 nm) uniform phase-separated hard domains (polystyrene) in all samples indicating that a block structure with TPE characteristics was formed.

|  | A | B | C | D | E | F |
|---|---|---|---|---|---|---|
| RO Water | 200 | 200 | 200 | 200 | 200 | 200 |
| Latex of Example 2 | 167 | 167 | 167 | 120 | 120 | 120 |
| Isoprene | 100 | — | — | 100 | — | — |
| Butadiene | — | 100 | 77.15 | — | 100 | 77.15 |
| Styrene | — | — | 22.85 | — | — | 22.85 |
| % Conv. | 100 | 97 | 100 | 98.6 | 100 | 100 |
| Time (hr) | 14 | 14 | 9 | 12 | 12 | 9 |
| Final % Solids | 28.6 | 27.7 | 28.6 | 28.8 | 29.8 | 29.5 |
| HB:SB Ratio | 18.8:81.2 | 18.8:81.2 | 18.8:81.2 | 24.4:75.6 | 24.4:75.6 | 24.4:75.6 |
| Pzn. Temp. (F.) | 149 | 149 | 149 | 149 | 149 | 149 |

HB:SB = Hard block:Soft block ratio
% Solids of latex of Example 2 = 20.6 uncorr.
Bottle Factor = 1.2 gms/part Clear latex cast films were easily prepared and demonstrated substantial strength and elastic recovery.

Example 5

Preparation of Emulsion S-NBR-S Triblock Copolymers From Seed Latex

In a similar manner to Example 4 above, a series of S-NBR-S triblock copolymer latexes were prepared from PS seed latexes in one quart bottles.

|  | A | B | C | D | E | F |
|---|---|---|---|---|---|---|
| RO Water | 241 | 197.1 | 84.7 | 241 | 197.1 | 160.5 |
| Latex of Example 2 | 63.8 | 128 | 227.5 | — | — | — |
| Latex of Example 3 | — | — | — | 56 | 112.3 | 168.7 |
| Butadiene | 80.4 | 71.3 | 72.1 | 80.4 | 71.3 | 60.9 |
| AN | 39.6 | 35.2 | 35.5 | 39.6 | 35.2 | 29.8 |
| % Conv. | 100 | 100 | 100 | ND* | ND* | ND* |
| Time (hr) | 6 | 2 | 2 | ND | ND | ND |
| Final % Solids | 31.0 | 31.0 | 35.6 | ND | ND | ND |
| HB:SB ratio | 10:90 | 20:80 | 30:70 | 10:90 | 20:80 | 30:70 |
| Pzn. Temp. (F.) | 149 | 149 | 149 | 149 | 149 | 149 |

*Although these polymerizations proceeded to high conversions, they were extremely sensitive to shear coagulation. Prior to isolation, 0.6 phr K/Oleate soap solution was added to regain latex stability.
HB:SB = Hard block:Soft block ratio
% Solids of latex of Example 2 = 20.6 uncorr.
% Solids of latex of Example 3 = 23.7 uncorr.
Bottle Factor = 1.3 gms/part

Example 6

Polymerization of Controlled $M_n$ & PDI Polystyrene by NMP Using Phenyl-t-butylnitrone (PBN)

A 2-gallon reaction vessel was initially charged with 1,000 grams of styrene, 60.0 grams of oleic acid and 10.0 grams of PBN. The reactor was then flushed with nitrogen, briefly evacuated and charged with an aqueous solution comprising 4,000 grams of RO water, 40.0 grams of potassium persulfate, 40.0 grams of tripotassium phosphate and 16.4 grams of potassium hydroxide. It should be noted that immediately upon mixing the aqueous solution with the organic, a fine microemulsion forms. The mixture is then rapidly heated to 75° C. Complete conversion to a stable, white polystyrene latex is achieved in less than 2 hours. Solids after stripping were 22.7%. GPC analysis of the final polymer gave a $M_n$ of 25,000 with a PDI of 1.80.

Example 7

Preparation of Emulsion S-I diblock Copolymers from Seed Latex

In a similar manner to Example 4 above, a series of S-I diblock copolymer latexes were prepared from PS seed latexes in one quart bottles.

|  | A | B | C | D | E |
|---|---|---|---|---|---|
| RO Water | 241 | 197.1 | 84.7 | 241 | 197.1 |
| Latex of Example 6 | 58.2 | 116.2 | 166.5 | 206.7 | 254.1 |
| Isoprene | 120 | 106.5 | 89 | 71 | 58.2 |
| % Conv. | 89 | 98 | 99 | 98 | 99 |
| Time (hr) | 21 | 13 | 12 | 12 | 12 |
| Final % Solids | 28.4 | 31.1 | 30 | 27.8 | 27.7 |
| HB:SB ratio | 10:90 | 20:80 | 30:70 | 40:60 | 50:50 |
| Pzn. Temp. (F.) | 149 | 149 | 149 | 149 | 149 |

HB:SB = Hard block:Soft block ratio
% Solids of latex of Example 6 = 22.7 uncorr.
Bottle Factor = 1.3 gms/part Clear latex cast films were easily prepared and demonstrated substantial strength and elastic recovery.

Example 8

Polymerization of Controlled $M_n$ & PDI Polystyrene by NMP Using Phenyl-t-butylnitrone (PBN) @ 65° C.

A 500-milliliter 3-neck round bottom reaction flask equipped with a mechanical paddle stirrer, condenser, pot thermometer and nitrogen inlet was initially charged with 50 grams (0.48 moles) of styrene, 3.0 grams (0.0106 moles) of oleic acid and 0.44 grams (0.002485 moles) of phenyl-t-butylnitrone (PBN). The flask was then flushed with nitrogen before being charged with an aqueous solution comprising 200 grams of distilled water, 2.06 grams (0.00762 moles) of potassium persulfate, 2.13 grams (0.01 moles) of tripotassium phosphate and 0.9 grams (0.014 moles) of 87.5% pure potassium hydroxide. It should be noted that immediately upon mixing the aqueous solution with the organic, a fine microemulsion forms. The mixture was then rapidly heated to 65° C. Complete conversion to a stable, white polystyrene latex was achieved in about 7 hours. GPC analysis of the final polymer gave a $M_n$ of 35,000; $M_w$ of 61,000 with a PDI of 1.74.

Comparative Example 9

It should be noted that a control polymerization of styrene conducted under the same conditions as Example 8 but without the nitrone gave an $M_n$ of 440,000; $M_w$ of 860,000 with a PDI of 1.95.

Example 10

Polymerization of Controlled $M_n$ & PDI Polystyrene by NMP Using Phenyl-t-butylnitrone (PBN) @ 75° C.

A one liter 3-neck round bottom reaction flask equipped with a mechanical paddle stirrer, condenser, pot thermometer and nitrogen inlet was initially charged with 200 grams (1.923 moles) of styrene, 12.0 grams (0.0424 moles) of oleic acid and 2.0 grams (0.0113 moles) of phenyl-t-butylnitrone (PBN). The flask was then flushed with nitrogen before being charged with an aqueous solution comprising 500 grams of distilled water, 8.0 grams (0.296 moles) of potassium persulfate, 8.0 grams (0.0377 moles) of tripotassium phosphate and 3.6 grams (0.056 moles) of 87.5% pure potassium hydroxide. It should be noted that immediately upon mixing the aqueous solution with the organic, a fine microemulsion forms. The mixture was then rapidly heated to 75° C. Complete conversion to a stable, white polystyrene latex was achieved in about 3.5 hours. GPC analysis of the final polymer gave a $M_n$ of 39,000; $M_w$ of 48,000 with a PDI of 1.22.

Example 11

Polymerization of Controlled $M_n$ & PDI Polystyrene by NMP Using Phenylisopropylnitrone (PIN) @ 65° C.

Using the same procedure as outlined in Example 8 above, an identical polymerization was run only substituting an equimolar amount of PIN in place of PBN. Again the polymerization reached completion in about 7 hours. Molecular weight analysis showed an $M_n$ of 41,000; $M_w$ of 70,000 with a PDI of 1.70.

Example 12

Polymerization of Controlled $M_n$ & PDI Poly(styrene-b-(n-butyl acrylate)) by NMP Using "Seed" Latex @ 65° C.

A 500-milliliter 3-neck round bottom reaction flask equipped with a mechanical paddle stirrer, condenser, pot thermometer and nitrogen inlet was charged with 100 grams of about 22% solids latex derived from Example 10. While being slowly purged with nitrogen at room temperature, a solution of 0.5 grams (0.00184 moles) of potassium persulfate in 100 milliliters of distilled water was added to the stirred latex followed by the addition of 22.0 grams (0.171 moles) of n-butyl acrylate. The mixture was then heated to about 65° C. where a weak exotherm to about 70° C. was noted. Complete conversion was reached within about 2 hours. Molecular weight analysis showed an $M_n$ of 45,000; $M_w$ of 77,000 and a PDI of 1.70.

It should be noted that these results strongly indicate the formation of a block copolymer and the presence of an active alkoxyamine functionality on the polystyrene "seed" chains capable of reinitiating polymerization.

Example 13

Polymerization of Controlled $M_n$ & PDI Polystyrene by NMP Using the "In-Situ" Preparation of PIN A 500-milliliter 3-neck round bottom reaction flask equipped with a mechanical paddle stirrer, condenser, pot thermometer and nitrogen inlet was initially charged with 3.0 grams (0.0106 moles) of oleic acid and 0.31 grams (0.00292 moles) of benzaldehyde and 1.4 grams (0.0028 moles) of a 15% aqueous solution of N-isopropylhydroxylamine. The flask was then flushed with nitrogen and stirred for 1 hour at room temperature before adding 50.0 grams (0.48 moles) of styrene followed by an aqueous solution comprising 200 grams of distilled water, 2.06 grams (0.00762 moles) of potassium persulfate, 2.13 grams (0.01 moles) of tripotassium phosphate and 0.9 grams (0.014 moles) of 87.5% pure potassium hydroxide. It should be noted that immediately upon mixing the aqueous solution with the organic, a fine microemulsion forms. The mixture was then rapidly heated to 75° C. Complete conversion to a stable, white polystyrene latex was achieved in about 4 hours. GPC analysis of the final polymer gave a $M_n$ of 31,000; $M_w$ of 55,000 with a PDI of 1.76.

It should be noted that the result from this experiment compares closely with Example 11 using preformed PIN.

Example 14

Polymerization of Controlled $M_n$ & PDI Polystyrene by NMP Using the "In-Situ" Generation of Nitric Oxide A 500-milliliter 3-neck round bottom reaction flask equipped with a mechanical paddle stirrer, condenser, pot thermometer and nitrogen inlet was initially charged with 50.0 grams (0.48 moles of styrene, 3.0 g (0.0092 moles) of dodecylbenzenesulfonic acid, and 1 milliliter of distilled water. To the stirred mixture was then added 0.171 grams (0.002485 moles) of sodium nitrite. The styrene phase almost immediately turned a light blue-green color which faded to a pale yellow within a few minutes. The flask was then flushed with nitrogen and before adding an aqueous solution comprising 200 grams of distilled water, 2.06 grams (0.00762 moles) of potassium persulfate, 2.13 grams (0.01 moles) of tripotassium phosphate and 0.74 grams (0.0115 moles) of 87.5% pure potassium hydroxide. It should be noted that immediately upon mixing the aqueous solution with the organic, a fine microemulsion forms. The mixture was then rapidly heated with stirring to 75° C. Complete conversion was achieved in about 3 hours. Molecular weight analysis showed a $M_n$ of 97,000; Mw of 147,000 and a PDI of 1.51.

It should be noted that it is known from J. F. Brown Jr. (*J. Am. Chem. Soc.* 1957, 79, 2480); and L. V. Phillips, et al (*J. Org. Chem.* 1964, 29, 1937) that nitric oxide will react with a variety of olefins such as isobutylene to give isolable alkoxyamine derivatives.

Example 15

Polymerization of Controlled $M_n$ & PDI Polystyrene with 1,1-Diphenylethylene

A 500-milliliter 3-neck round bottom reaction flask equipped with a mechanical paddle stirrer, condenser, pot thermometer and nitrogen inlet was initially charged with 50 grams (0.48 moles) of styrene, 3.0 grams (0.0106 moles) of oleic acid and 0.448 grams (0.002485 moles) of 1,1-diphenylethylene (DPE). The flask was then flushed with nitrogen before being charged with an aqueous solution comprising 200 grams of distilled water, 2.06 grams (0.00762 moles) of potassium persulfate, 2.13 grams (0.01 moles) of tripotassium phosphate and 0.92 grams (0.0143 moles) of 87.5% pure potassium hydroxide. It should be noted that immediately upon mixing the aqueous solution with the organic, a fine microemulsion forms. The mixture was then rapidly heated to 75° C. Complete conversion to a stable, white polystyrene latex was achieved in about 2 hours. GPC analysis of the final polymer gave a $M_n$ of 51,000; Mw of 92,000 with a PDI of 1.80.

Example 16

Polymerization of Controlled $M_n$ & MWD Polystyrene by RAFF High Solids/Low KPS A 2-gallon reaction vessel was initially charged with 2,240 grams of styrene, 134.4 grams of oleic acid and 16.0 grams of dibenzyltrithiocarbonate. The reactor was then flushed with nitrogen, briefly evacuated and charged with an aqueous solution comprising 3,808 grams of RO water, 13.44 grams of potassium persulfate, 89.6 grams of tripotassium phosphate and 36.96 grams of potassium hydroxide. It should be noted that immediately upon mixing the aqueous solution with the organic, a fine microemulsion forms. The mixture is then rapidly heated to 65° C. Complete conversion to a stable, slightly yellow polystyrene latex (38.9% solids) is achieved in less than 3 hours. GPC analysis of the final polymer gave a $M_n$ of 45,500 with a PDI of 1.11.

Example 17

Emulsion Polymerization of Controlled $M_n$ & PDI Polystyrene by NMP: "In-Situ" Generation of Nitric Oxide with Acetic Acid A 500-milliliter 3-neck round bottom reaction flask equipped with a mechanical paddle stirrer, condenser, pot thermometer and nitrogen inlet was initially charged with 0.69 grams (0.01 moles) sodium nitrite, 3.0 grams (0.0106 moles) of oleic acid and 50 grams (0.48 moles) of styrene. To the stirred mixture was then added all at once a solution of 1.0 grams (0.0167 moles) of concentrated acetic acid in 2 grams of water. The styrene phase almost immediately turned a light blue-green color which faded to a pale yellow within 15 minutes. The flask was then flushed with nitrogen before adding an aqueous solution comprising 160 grams of distilled water, 2.0 grams (0.00739 moles) of potassium persulfate, 2.0 grams (0.01 moles) of tripotassium phosphate and 2.35 grams (0.0367 moles) of 87.5% pure potassium hydroxide. It should be noted that immediately upon mixing the aqueous solution with the organic, a fine microemulsion forms. The mixture was then rapidly heated with stirring to 75° C. Complete conversion (26.1% solids) was achieved in about 2.5 hours. Molecular weight analysis showed an $M_n$ of 96,300; $M_w$ of 135,000 and a PDI of 1.4.

Example 18

Controlled Emulsion Polymerization of Styrene with Crude 1-Chloro-1,1-diphenylethane A 500-milliliter 3-neck round bottom reaction flask equipped with a mechanical paddle stirrer, condenser, pot thermometer and nitrogen inlet was initially charged with 50 grams (0.48 moles) of styrene, 3.0 grams (0.0106 moles) of oleic acid and approximately 0.01 moles of crude 1-chloro-1,1-diphenylethane prepared separately by vigorously mixing 2.0 grams (about 0.01 moles) of 1,1-diphenylethanol with 10 milliliters of concentrated HCl and 5 milliliters of toluene for 30 minutes at room temperature. The organic top layer containing 1-chloro-1,1-diphenylethane was then removed and added to the styrene/oleic acid mixture. The flask was then flushed with nitrogen before being charged with an aqueous solution comprising 200 grams of distilled water, 2.0 grams (0.0074 moles) of potassium persulfate, 2.0 grams (0.0094 moles) of tripotassium phosphate and 1.55 grams (0.0242 moles) of 87.5% pure potassium hydroxide. It should be noted that immediately upon mixing the aqueous solution with the organic, a fine microemulsion forms. The mixture was then rapidly heated to 75° C. Complete conversion to a stable, white polystyrene latex (22.7% solids) was achieved in about 4 hours. GPC analysis of the final polymer gave a $M_n$ of 40,000 with a PDI of 1.37.

Example 19

Controlled Emulsion Polymerization of Styrene with Crude 1-Chloro-1,1-diphenylethane: High Solids Recipe A 5-liter 3-neck round bottom reaction flask equipped with a mechanical paddle stirrer, condenser, pot thermometer and nitrogen inlet was initially charged with 1,300 grams (12.5 moles) of styrene, 78.0 grams (0.2756 moles) of oleic acid and 39.0 grams of crude 1-chloro-1,1-diphenylethane. The flask was then flushed with nitrogen before being charged with an aqueous solution comprising 2,470 grams of deionized reverse osmosis (RO) water, 50.7 grams (0.1875 moles) of potassium persulfate, 50.7 grams (0.2388 moles) of tripotassium phosphate and 29.5 grams (0.602 moles) of 87.5% pure potassium hydroxide. It should be noted that immediately upon mixing the aqueous solution with the organic, a fine microemulsion forms. The mixture was then rapidly heated to 75° C. Complete conversion to a stable, white polystyrene latex (38.6% solids) was achieved in about 5.5 hours. GPC analysis of the final polymer gave a $M_n$ of 32,000 with a PDI of 1.85.

Example 20

ATRP Emulsion Copolymerization of n-Butyl Acrylate and 1-Hexene

Again, in an effort to expand the scope and utility of CFR microemulsion technology, the copolymerization of n-butyl acrylate with 1-hexene via a microemulsion ATRP variant of CFR was attempted. It should be noted that it is very difficult to copolymerize even ethylene with acrylates under conventional free radical emulsion conditions. It has been published however, that 1-olefins can be copolymerized with methyl acrylate using homogeneous ATRP conditions (*J. Am. Chem. Soc.*, 2001, 123, 12738). In this case, a mixture of 25 grams 1-hexene, 25 grams n-butyl acrylate, 0.38 grams of dipyridyl, 4.0 grams of oleic acid and 0.47 grams of ethyl 2-bromoisobutyrate were charged into a 500-milliliter 3-neck round bottom flask equipped with a nitrogen inlet, mechanical paddle stirrer, pot thermometer and condenser. The stirred homogeneous solution was flushed with a slow stream of nitrogen. This was followed by the addition of a solution of 1.7 grams of 85% KOH in 139 milliliters of distilled water. A uniform emulsion begins to form immediately. After approximately 2 minutes, 60.9 grams of a 1% aqueous copper sulfate pentahydrate solution was added. This turned the white emulsion into a sky-blue emulsion. To this emulsion 2 drops of hydrazine hydrate were added upon which the mixture turns a deep red-brown color. The mixture was heated to about 67° C. for 1.5 hours where the reaction was stopped at 10.9% solids. The latex emulsion was then stripped at reduced pressure to remove unreacted monomers. Latex was then coagulated in excess cold dilute HCl solution. It should be noted that brown color disappears and the aqueous phase becomes a clear pale blue (Cu (II) ion). Polymer separates as a sticky low molecular weight material. This material was extracted into dichloromethane and evaporated to give 27.8 grams of liquid polymer. This material was then submitted for NMR analysis where $^{13}$C-NMR determined that 5.5 mole % 1-hexene had been incorporated into the copolymer largely as isolated units.

Example 21

Controlled Emulsion Polymerization of Styrene Using N,N'-Bis-Isopropyl Nitrone of p-Terephthaldehyde A 500-milliliter 3-neck round bottom reaction flask equipped with a mechanical paddle stirrer, condenser, pot thermometer and nitrogen inlet was initially charged with 100 grams (0.96 moles) of styrene, 6.0 grams (0.02124 moles) of oleic acid and 0.62 grams (0.0025 moles) of the bis-N-isopropyl nitrone of p-terephthaldehyde (BIN). The flask was then flushed with nitrogen before being charged with an aqueous solution comprising 250 grams of distilled water, 4.0 grams (0.0148 moles) of potassium persulfate, 4.0 grams (0.02 moles) of tripotassium phosphate and 1.8 grams (0.028 moles) of 87.5% pure potassium hydroxide. It should be noted that immediately upon mixing the aqueous solution with the organic, a fine microemulsion forms. The mixture was then rapidly heated to 75° C. Complete conversion to a stable, white polystyrene latex (31.4% solids) was achieved in about 3 hours. GPC analysis of the final polymer gave a $M_n$ of 54,600; $M_w$ of 85,900 with a PDI of 1.57.

Example 22

Controlled Emulsion Polymerization of Methyl Methacrylate Using N,N'-Bis-Isopropyl Nitrone of p-Terephthaldehyde A 500-milliliter 3-neck round bottom reaction flask equipped with a mechanical paddle stirrer, condenser, pot thermometer and nitrogen inlet was initially charged with 104 grams (1.04 moles) of methyl methacrylate monomer, 6.24 grams (0.02213 moles) of oleic acid and 1.1 grams (0.00443 moles) of the bis-N-isopropyl nitrone of p-terephthaldehyde (BIN). The flask was then flushed with nitrogen before being charged with an aqueous solution comprising 210 grams of water purified by reverse osmosis, 4.95 grams (0.0183 moles) of potassium persulfate, 4.95 grams (0.0233 moles) of tripotassium phosphate and 1.87 grams (0.0292 moles) of 87.5% pure potassium hydroxide. It should be noted that immediately upon mixing the aqueous solution with the organic, a fine microemulsion forms. The mixture was then rapidly heated to 60° C. After 6.5 hours, latex solids reached 33.6% (about 91% conversion). GPC analysis of the final polymer gave a $M_n$ of 91,000; $M_w$ of 156,700 with a PDI of 1.72.

Example 23

One-Pot Preparation of PS-b-(SIR) Latex with Phenyl-t-butyl Nitrone as Control Agent A 2-gallon reaction vessel was initially charged with 680 grams of styrene, 40.8 grams of oleic acid and 6.8 grams of phenyl-t-butyl nitrone (PBN). The reactor was then flushed with nitrogen, briefly evacuated and charged with an aqueous solution comprising 2,720 grams of water purified by reverse osmosis, 27.2 grams of potassium persulfate, 27.2 grams of tripotassium phosphate and 11.15 grams of potassium hydroxide. It should be noted that immediately upon mixing the aqueous solution with the organic, a fine microemulsion forms. The mixture is then rapidly heated to 65° C. The progress of the reaction was measured gravimetrically by determining the percent solids of the latex. After 4 hours, the percent solids of the latex had reached 13.6%. The reaction mixture was then rapidly cooled to room temperature before charging an additional 1,020 grams of water purified by reverse osmosis followed by 1,360 grams of isoprene. The stirred reaction was then reheated to 65° C. and run to constant solids (36.1% total solids) in 20 hours. This solids level represents about 99% conversion.

Example 24

Synthesis of a Poly(styrene-b-(n-butyl acrylate)-b-styrene) Triblock Copolymers Using a RAFT-type Control Agent and an Persulfate Type Initiator In the procedure used, an aqueous solution consisting of 3.37 grams $K_2S_2O_8$, 0.89 grams KOH and 3.2 g $K_3PO_4$ in 64.4 grams water was added to a mixture of 1.27 grams of dibenzyltrithiocarbonate, 3.0 grams oleic acid and 23 grams styrene shaken in a heavy-walled pop bottle, which formed an emulsion instantaneously. The emulsion was shaken in a water bath at 65° C. for 3 hours. The latex was filtered through glass wool and coagulated for GPC analysis. Analysis showed that the latex had a solids content of 34.9%, a $M_n$ of 12,300, $M_w$ of 14,400, and a polydispersity index (PDI) of 1.17.

Subsequently, 14.7 grams of n-butyl acrylate and 27 grams of water were added to 34.3 grams of the polystyrene latex. This mixture was purged with and shaken in a water bath at 62° C. for 4 hours. Analysis showed that the latex had a $M_n$ of 34,800, $M_w$ of 40,500 and a PDI of 1.16.

Example 25

Synthesis of a Poly((n-butyl acrylate)-b-styrene-b-(n-butyl acrylate)) Triblock Copolymers Using a RAFT-Type Control Agent and an Persulfate Type Initiator In the procedure used, an aqueous solution consisting of 1.56 grams $K_2S_2O_8$, 0.69 grams KOH and 1.69 grams $K_3PO_4$ in 60.0 grams water was added to a mixture of 0.4 grams of dibenzyltrithiocarbonate, 2.0 grams oleic acid and 35.2 grams n-butyl acrylate shaken in a heavy-walled pop bottle, form an emulsion instantaneously. The emulsion was shaken in a water bath at 65° C. for 3 hours. The latex was filtered through glass wool and coagulated for GPC analysis. Analysis showed that the latex had a solids content of 40.0%, a $M_n$ of 26,000, $M_w$ of 32,000, and a PDI of 1.2.

Subsequently, 2.73 grams styrene and 0.01 grams $K_2S_2O_8$ were added to 25.0 grams of the poly(n-butyl acrylate) latex. This mixture was purged with and shaken in a water bath at 65° C. for 20 hours. Analysis showed that the latex had a $M_n$ of 36,800, $M_w$ of 53,100 and a PDI of 1.44.

Example 26

Synthesis of a Poly(styrene-b-isoprene-b-styrene) Triblock Copolymers Using a RAFT-type Control Agent and an Iron-EDTA/ROOH Type Initiator at Room-Temperature In the procedure used, an aqueous solution consisting of 0.12 grams sodiumformaldehydesulfoxylate hydrate, 0.64 grams KOH and 0.14 grams $K_3PO_4$ in 60.0 grams water was added to a mixture of 0.32 grams of dibenzyltrithiocarbonate, 6.0 grams oleic acid and 25 grams styrene shaken in a heavy-walled pop bottle, which formed an emulsion instantaneously. The emulsion was purged with $N_2$ for 15 minutes and 1.0 grams of 1.0% solution of Fe-EDTA complex was added followed by 0.1 grams of pinane hydroperoxide (44% solution) and the resulting emulsion shaken at room-temperature for 3 hours. The latex was filtered through glass wool and coagulated for GPC analysis. Analysis showed that the latex had a solids content of 35.2%, a $M_n$ of 29,000, $M_w$ of 45,000, and a PDI of 1.57.

Subsequently, 8.0 grams isoprene, 12 grams water, 0.7 grams Fe-EDTA complex and 0.05 grams sodiumformaldehydesulfoxylate hydrate were added to 34.3 grams of the polystyrene latex. This mixture was purged with $N_2$ before addition of 0.25 grams of pinane hydroperoxide (44% solution). The emulsion was shaken at room temperature for 4 hours. Analysis showed that the latex had a solids content of 33.0%, a $M_n$ of 72,000, $M_w$ of 125,700, and a PDI of 1.7.

Example 27

Synthesis of a Poly(styrene-b-(n-butyl acrylate)-b-styrene) Using a RAFF-Type Control Agent and an Iron-EDTA/ROOH Type Initiator at Room-Temperature In the procedure used, 19.1 grams n-butyl acrylate, 40 grams water, 0.8 grams Fe-EDTA complex and 0.07 grams sodiumformaldehydesulfoxylate hydrate were added to 30 grams of polystyrene latex. This mixture was purged with $N_2$ before addition of 0.25 g of pinane hydroperoxide (44% solution). The emulsion was shaken at room temperature for 4 hours. Analysis showed that the latex had a solids content of 31.0%, a $M_n$ of 87,000, $M_w$ of 113,000, and a PDI of 1.3.

Example 28

Synthesis of a Poly(styrene) Seed Using a BIN type Control Agent with a Persulfate Initiator Followed by the Synthesis of a Poly(styrene-b-(n-butyl acrylate)-b-styrene) Triblock Using a Iron-EDTA/ROOH Type Initiator In the procedure used, an aqueous solution consisting of 1.28 grams $K_2S_2O_8$, 0.83 grams KOH and 1.25 grams $K_3PO_4$ in 66.6 grams water was added to a mixture of 0.315 grams of BIN, 2.92 grams oleic acid and 26 grams styrene shaken in a heavy-walled pop bottle, which formed an emulsion instantaneously. The emulsion was shaken in a water bath at 65° C. for 3 hours. The latex was filtered through glass wool and coagulated for GPC analysis. Analysis showed that the latex had a solids content of 25.0%, a $M_n$ of 45,000, $M_w$ of 60,000, and a PDI of 1.33.

Subsequently, 18.85 grams n-butyl acrylate, 1.0 grams of 1% Fe-EDTA solution, 0.07 grams sodiumformaldehydesulfoxylate hydrate and 40 grams water were added to 30.34 grams of the above polystyrene latex. This mixture was purged with $N_2$, 0.5 grams of pinane hydroperoxide (44% solution) and shaken in a water bath at room temperature (20° C.) for 2.5 hours. Analysis showed that the latex had a $M_n$ of 125,000, $M_w$ of 200,000, and a PDI of 1.63.

Example 29

Synthesis of a Poly(styrene) Latex Using Phenyl t-butyl Nitrone (PBN) and 1,1-Diphenylethylene (DPE) as Control Agents With an Iron-EDTA/ROOH Type Initiator at Room-Temperature

PBN:

In the procedure used, an aqueous solution consisting of 0.1 grams sodiumformaldehydesulfoxylate hydrate, 0.316 grams KOH and 0.172 grams $K_3PO_4$ in 55.2 grams water was added to a mixture of 0.22 grams of PBN, 2.46 grams oleic acid and 25.5 grams styrene shaken in a heavy-walled pop bottle, which formed an emulsion instantaneously. The emulsion was purged with $N_2$ for 15 minutes and 1.0 grams of 1.0% solution of Fe-EDTA complex was added followed by 0.1 grams of pinane hydroperoxide (44% solution) and the resulting emulsion shaken at room-temperature for 3 hours. The latex was filtered through glass wool and coagulated for GPC analysis. Analysis showed that the latex had a solids content of 34.2%, a $M_n$ of 70,700, $M_w$ of 100,000 and a PDI of 1.43.

DPE:

An aqueous solution consisting of 0.125 grams sodiumformaldehydesulfoxylate hydrate, 0.307 grams KOH and 0.182 grams $K_3PO_4$ in 52.3 grams water was added to form a mixture of 0.23 grams of DPE, 2.53 grams oleic acid and 24.6 grams styrene shaken in a heavy-walled pop bottle, which formed an emulsion instantaneously. The emulsion was purged with $N_2$ for 15 minutes and 1.0 grams of 1.0% solution of Fe-EDTA complex was added followed by 0.1 grams of pinane hydroperoxide (44% solution) and the resulting emulsion shaken at room temperature for 3 hours. The latex was filtered through glass wool and coagulated for GPC analysis. Analysis showed that the latex had a solids content of 35%, a $M_n$ of 51,000, $M_w$ of 75,700, and a PDI of 1.48.

Example 30

Molecular Weight Control for Styrene Polymerization with Phenyl-t-Butyl Nitrone (PBN) as Control Agent and Potassium Persulfate as Initiator

A series of styrene polymerization reactions was performed using potassium persulfate as initiator and different amounts of PBN as control agent. In a typical reaction, styrene (100 grams; 962 mmol), oleic acid (6.0 grams; 21.2 mmol) and PBN were added to a 750 milliliter champagne bottle. After flushing with nitrogen, a solution of $K_3PO_4$ (4.0 grams; 18.8 mmol), KOH (1.64 grams; 29.3 mmol) and $K_2S_2O_8$ (2.62 mole per mole of PBN) in water (400 grams) was added with stirring. In all cases, an emulsion formed immediately. Bottles were flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from each bottle and evaporating in an aluminum weighing pan to constant weight at 140° C. In all cases, the conversion of styrene to polystyrene was essentially complete. Samples of solid polymer for subsequent GPC analysis were obtained by coagulating 100 milliliters of latex with dilute aqueous HCl, filtering and washing with water and air-drying at 25° C. The GPC data for polymer prepared using different amounts of PBN are collected in the table below. A plot of $M_n$ versus the molar ratio of styrene/PBN is linear, which is consistent with a controlled polymerization process.

| PBN (g) | PBN (mmol) | styrene (g) | mmol | sty/PBN | $M_n$ |
|---|---|---|---|---|---|
| 0.75 | 4.24 | 100 | 962 | 227 | 52300 |
| 0.75 | 4.24 | 100 | 962 | 227 | 45290 |
| 1 | 5.65 | 100 | 962 | 170 | 37200 |
| 1 | 5.65 | 100 | 962 | 170 | 33060 |
| 1.25 | 7.06 | 100 | 962 | 136 | 32300 |
| 1.25 | 7.06 | 100 | 962 | 136 | 27300 |
| 1.7 | 9.6 | 100 | 962 | 100 | 20860 |

Example 31

Molecular Weight Control for Styrene Polymerization with Phenyl-t-Butyl Nitrone (PBN) as Control Agent and 4,4-Azobis(4-cyanovaleric acid) (ABCV) as Initiator

A series of styrene polymerization reactions was performed using 4,4-azobis(4-cyanovaleric acid) as initiator and different amounts of PBN as control agent. In a typical reaction, styrene (100 grams; 962 mmol), oleic acid (6.0 grams; 21.2 mmol) and PBN were added to a 750 milliliter champagne bottle. After flushing with nitrogen, a solution of $K_3PO_4$ (4.0 grams; 18.8 mmol), KOH (29.3 mmol+2 mmol KOH per ABCV) and ABCV (2.62-3.50 mole per mole of PBN) in water (400 grams) was added with stirring. In all cases, an emulsion formed immediately. Bottles were flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from each bottle and evaporating in an aluminum weighing pan to constant weight at 140° C. In all cases, the conversion of styrene to polystyrene was essentially complete. Samples of solid polymer for subsequent GPC analysis were obtained by coagulating 100 milliliters of latex with dilute aqueous HCl, filtering and washing with water and air-drying at 25° C. The GPC data for polymer prepared using different amounts of PBN are collected in the table below. A plot of $M_n$ versus the molar ratio of styrene/PBN is linear, which is consistent with a controlled polymerization process.

| PBN (g) | PBN (mmol) | ABCV/PBN | styrene (g) | Styrene (mmol) | styrene/PBN | $M_n$ |
|---|---|---|---|---|---|---|
| 0.75 | 4.24 | 3.50 | 100 | 962 | 227 | 53780 |
| 1 | 5.65 | 3.50 | 100 | 962 | 170 | 39910 |
| 1 | 5.65 | 3.50 | 100 | 962 | 170 | 39050 |
| 1.25 | 7.06 | 3.50 | 100 | 962 | 136 | 31490 |
| 1.25 | 7.06 | 3.50 | 100 | 962 | 136 | 30950 |
| 0.75 | 4.24 | 2.62 | 100 | 962 | 227 | 59840 |
| 1 | 5.65 | 2.62 | 100 | 962 | 170 | 40370 |

Example 32

Molecular Weight Control for Styrene Polymerization with N,N'-Bis-Isopropyl Nitrone of p-Terephthaldehyde (BIN) as Control Agent and Potassium Persulfate as Initiator

A series of styrene polymerization reactions was performed using potassium persulfate as initiator and different amounts of BIN as control agent. In a typical reaction, styrene (100 grams; 962 mmol), oleic acid (6.0 grams; 21.2 mmol) and BIN were added to a 750 milliliter champagne bottle. After flushing with nitrogen, a solution of $K_3PO_4$ (4.0 g; 18.8 mmol), KOH (1.64 grams; 29.3 mmol) and $K_2S_2O_8$ (2.62 mole per mole of BIN) in water (400 grams) was added with stirring. In all cases, an emulsion formed immediately. Bottles were flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from each bottle and evaporating in an aluminum weighing pan to constant weight at 140° C. In all cases, the conversion of styrene to polystyrene was essentially complete. Samples of solid polymer for subsequent GPC analysis were obtained by coagulating 100 milliliters of latex with dilute aqueous HCl, filtering and washing with water and air-drying at 25° C. The GPC data for polymer prepared using different amounts of BIN are collected in the table below. A plot of $M_n$ versus the molar ratio of styrene/BIN is linear, which is consistent with a controlled polymerization process.

| BIN (g) | BIN (mmol) | styrene (g) | Styrene (mmol) | styrene/BIN | $M_n$ |
|---|---|---|---|---|---|
| 0.53 | 2.14 | 100 | 962 | 450 | 92270 |
| 0.7 | 2.82 | 100 | 962 | 341 | 50630 |
| 0.88 | 3.55 | 100 | 962 | 271 | 41970 |
| 1.06 | 4.28 | 100 | 962 | 225 | 42300 |
| 1.19 | 4.8 | 100 | 962 | 200 | 37100 |

Example 33

Polymerization of Styrene with
1,1-Diphenylethylene (DPE) as Control Agent,
Potassium Persulfate as Initiator,
Dodecylbenzenesulfonic Acid as Latent Surfactant
and KOH as Surfactant Activator Styrene (100 grams; 962 mmol), dodecylbenzenesulfonic acid (9.9 grams of 70% solution in i-PrOH; 21.2 mmol) and DPE (0.9 grams; 5.0 mmol) were added to a 750 milliliter champagne bottle. After flushing with nitrogen, a solution of $K_3PO_4$ (4.0 grams; 18.8 mmol), KOH (1.64 grams; 29.3 mmol) and $K_2S_2O_8$ (4.0 grams, 14.8 mmol) in water (400 grams) was added with stirring. An emulsion formed immediately. The bottle was flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from the bottle and evaporating in an aluminum weighing pan to constant weight at 140° C. The conversion of styrene to polystyrene was essentially complete after 5 hours (22.7% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 69,500 with a PDI of 1.48.

Example 34

Polymerization of Styrene with
1,1-Diphenylethylene (DPE) as Control Agent,
Potassium Persulfate as Initiator, Oleic Acid as
Latent Surfactant and KOH as Surfactant Activator Styrene (100 grams; 962 mmol), oleic acid (6.0 grams; 21.2 mmol) and DPE (0.9 grams; 5.0 mmol) were added to a 750 milliliter champagne bottle. After flushing with nitrogen, a solution of $K_3PO_4$ (4.0 grams; 18.8 mmol), KOH (1.64 grams; 29.3 mmol) and $K_2S_2O_8$ (4.0 grams, 14.8 mmol) in water (400 grams) was added with stirring. An emulsion formed immediately. The bottle was flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from the bottle and evaporating in an aluminum weighing pan to constant weight at 140° C. The conversion of styrene to polystyrene was essentially complete after 5 hours (22.1% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 66,900 with a PDI of 1.60.

Example 35

Polymerization of Styrene with
1,1-Diphenylethylene (DPE) as Control Agent,
Potassium Persulfate as Initiator, Palmitoyl Chloride
as Latent Surfactant and KOH/Glycine as Surfactant
Activator Styrene (100 grams; 962 mmol), palmitoyl chloride (5.8 grams; 21.1 mmol) and DPE (0.9 grams; 5.0 mmol) were added to a 750 milliliter champagne bottle. After flushing with nitrogen, a solution of $K_3PO_4$ (4.0 grams; 18.8 mmol), glycine (1.57 grams, 20.9 mmol), KOH (2.82 grams; 50.4 mmol) and $K_2S_2O_8$ (4.0 grams, 14.8 mmol) in water (400 grams) was added with stirring. An emulsion formed immediately. The bottle was flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from the bottle and evaporating in an aluminum weighing pan to constant weight at 140° C. The conversion of styrene to polystyrene was essentially complete after 4 hours (21.2% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 90,500 with a PDI of 1.32.

Example 36

Polymerization of Styrene with Phenyl-t-Butyl
Nitrone (PBN) as Control Agent, Potassium
Persulfate as Initiator, Palmitoyl Chloride as Latent
Surfactant and KOH/Glycine as Surfactant Activator Styrene (100 grams; 962 mmol), palmitoyl chloride (5.8 grams; 21.1 mmol) and PBN (1.0 grams; 5.65 mmol) were added to a 750 milliliter champagne bottle. After flushing with nitrogen, a solution of $K_3PO_4$ (4.0 grams; 18.8 mmol), glycine (1.57 grams, 20.9 mmol), KOH (2.82 grams; 50.4 mmol) and $K_2S_2O_8$ (4.0 grams, 14.8 mmol) in water (400 grams) was added with stirring. An emulsion formed immediately. The bottle was flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from the bottle and evaporating in an aluminum weighing pan to constant weight at 140° C. The conversion of styrene to polystyrene was essentially complete after 4 hours (21.4% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 177,500 with a PDI of 1.44.

Example 37

Polymerization of Styrene with
1,1-Diphenylethylene (DPE) as Control Agent,
Sodium Persulfate as Initiator, Myristoyl Chloride as
Latent Surfactant and NaOH/Sarcosine as Surfactant
Activator Styrene (100 grams; 962 mmol), myristoyl chloride (5.21 grams; 21.1 mmol) and DPE (0.9 grams; 5.0 mmol) were added to a 750 milliliter champagne bottle. After flushing with nitrogen, a solution of $Na_3PO_4$ (3.1 grams; 18.9 mmol), sarcosine (1.87 grams, 21.0 mmol), NaOH (1.71 grams; 42.8 mmol) and $Na_2S_2O_8$ (3.5 grams, 14.7 mmol) in water (400 grams) was added with stirring. An emulsion formed immediately. The bottle was flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from the bottle and evaporating in an aluminum weighing pan to constant weight at 140° C. The conversion of styrene to polystyrene was essentially complete after 12 hours (21.2% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 67,300 with a PDI of 1.7.

Example 38

Polymerization of Styrene with Phenyl-t-Butyl Nitrone (PBN) as Control Agent, Sodium Persulfate as Initiator Myristoyl Chloride as Latent Surfactant and NaOH/Sarcosine as Surfactant Activator Styrene (100 grams; 962 mmol), myristoyl chloride (5.21 grams; 21.1 mmol) and PBN (1.0 grams; 5.65 mmol) were added to a 750 milliliter champagne bottle. After flushing with nitrogen, a solution of $Na_3PO_4$ (3.1 grams; 18.9 mmol), sarcosine (1.87 grams, 21.0 mmol), NaOH (1.71 grams; 42.8 mmol) and $Na_2S_2O_8$ (3.5 grams, 14.7 mmol) in water (400 g) was added with stirring. An emulsion formed immediately. The bottle was flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from the bottle and evaporating in an aluminum weighing pan to constant weight at 140° C. The conversion of styrene to polystyrene was essentially complete after 4 hours (21.9% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 179,400 with a PDI of 1.84.

Example 39

Polymerization of Styrene with 1,1-Diphenylethylene (DPE) as Control Agent Sodium Persulfate as Initiator, N-Myristoylsarcosine (Hamposyl M) as Latent Surfactant and NaOH as Surfactant Activator Styrene (100 grams; 962 mmol), Hamposyl M (6.32 grams; 21 mmol) and DPE (0.9 grams; 5.0 mmol) were added to a 750 milliliter champagne bottle. After flushing with nitrogen, a solution of $Na_3PO_4$ (3.1 grams; 18.9 mmol), NaOH (0.87 grams; 21.8 mmol) and $Na_2S_2O_8$ (3.5 grams, 14.7 mmol) in water (400 grams) was added with stirring. An emulsion formed immediately. The bottle was flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from the bottle and evaporating in an aluminum weighing pan to constant weight at 140° C. The conversion of styrene to polystyrene was essentially complete after 4 hours (22.4% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 66,980 with a PDI of 1.59.

Example 40

Polymerization of Styrene with Phenyl-t-Butyl Nitrone (PBN) as Control Agent, Sodium Persulfate as Initiator, N-Myristoylsarcosine (Hamposyl M) as Latent Surfactant and NaOH as Surfactant Activator Styrene (100 grams; 962 mmol), Hamposyl M (6.32 grams; 21 mmol) and PBN (1.0 grams; 5.65 mmol) were added to a 750 milliliter champagne bottle. After flushing with nitrogen, a solution of $Na_3PO_4$ (3.1 grams; 18.9 mmol), NaOH (0.87 grams; 21.8 mmol) and $Na_2S_2O_8$ (3.5 grams, 14.7 mmol) in water (400 grams) was added with stirring. An emulsion formed immediately. The bottle was flushed with nitrogen, capped with a "sure seal" metal cap and mounted on a rotating wheel in a thermostatted water bath (75° C.). The extent of polymerization was monitored hourly by withdrawing aliquots (~5 milliliters) of latex from the bottle and evaporating in an aluminum weighing pan to constant weight at 140° C. The conversion of styrene to polystyrene was essentially complete after 5 hours (22.2% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 49,170 with a PDI of 1.22.

Example 41

Degenerative Iodine Transfer Polymerization of Styrene with Perfluorohexyl Iodide as Control Agent, 4,4-Azobis(4-cyanovaleric acid) (ABCV) as Initiator, Oleic Acid as Latent Surfactant and NaOH as Surfactant Activator Styrene (100 grams; 962 mmol), oleic acid (6.0 grams; 21.2 mmol) and perfluorohexyl iodide (1.74 grams; 3.9 mmol) were added to a 750 milliliter champagne bottle. After flushing with nitrogen, a solution of $Na_3PO_4$ (3.5 grams; 21.3 mmol), NaOH (0.92 grams; 23 mmol) and ABCV (0.2 grams, 0.71 mmol) in water (400 grams) was added with stirring. An emulsion formed immediately. The bottle was flushed with nitrogen, capped with a "sure seal" metal cap and mounted on a rotating wheel in a thermostatted water bath (70° C.). The extent of polymerization was monitored hourly by withdrawing aliquots (~5 milliliters) of latex from the bottle and evaporating in an aluminum-weighing pan to constant weight at 140° C. The conversion of styrene to polystyrene was essentially complete after 5 hours (21.2% solids). A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 36,130 with a PDI of 1.24.

Example 42

Polymerization of Controlled $M_n$: Poly(styrene-b-(Vinylidene Dichloride/Methyl Methacrylate)-b-stryene) with Dibenzyl Trithiocarbonate (DBTTC) as Control Agent, Potassium Persulfate as Initiator, Oleic Acid as Latent Surfactant and KOH as Surfactant Activator A polystyrene latex with 22.6% solids, $M_n$ of 29,600 and PDI of 1.6 was prepared as described in Example 2 from 1020 grams of styrene, 60 grams of oleic acid, 9.5 grams of DBTTC and 18 grams of KOH. A 150-gram portion of this latex was combined with water (275 grams), vinylidene dichloride (28 grams, 0.29 mol), methyl methacrylate (7 grams, 0.070 mol) and potassium persulfate (0.2 grams) in a 750 milliliter champagne bottle. The bottle was flushed with nitrogen, capped with a "sure seal" metal cap and mounted on a rotating wheel in a thermostatted water bath (50° C.). Polymerization for 7 hours produced latex with 12.5% solids. A sample of solid polymer for GPC analysis was obtained by coagulating 100 milliliters of latex with dilute aqueous HCl, filtering and washing with water and air-drying at 25° C. GPC analysis (THF, 25° C.) of the final polymer gave $M_n$ of 35,600 with a PDI of 1.44.

Example 43

Polymerization of Controlled $M_n$: Poly(styrene) with 1,1-Diphenylethylene (DPE) as Control Agent and Subsequent Incorporation of Ethylene A polystyrene latex with $M_n$ of 51,000 and PDI of 1.29 was prepared similar to Example 15. A portion of this latex (14.85 grams) was placed in a small glass vial fitted with a cap containing a pin hole. The vial was secured inside a high-pressure reaction vessel containing ½ inch of standing water. The reactor was flushed with ethylene by thrice pressurizing the reactor with 50 psig ethylene and venting. The reactor was slowly pressurized to 400 psig with ethylene and sealed. Upon heating to 250° C., the pressure inside the reactor increased above 1000 psi. After 4 hours at 250° C., the reactor was cooled to 25° C., which reduced the pressure to approximately 300 psi. After the reactor was vented, the mass of the latex-containing vial was determined to be 0.151 g greater. A sample of solid polymer for GPC analysis was obtained by coagulating with dilute aqueous HCl, filtering, washing with water and air-drying at 25° C. GPC analysis (THF, 25° C.) of the final polymer gave $M_n$ of 30,500 with a PDI of 1.73.

Example 44

Polymerization of Controlled MW and PDI: Poly(styrene-b-butadiene-b-styrene) with Dibenzyl Trithiocarbonate (DBTTC) as Control Agent, Potassium Persulfate as Initiator, Oleic Acid as Latent Surfactant and KOH as Surfactant Activator A polystyrene latex with 22.6% solids, $M_n$ of 31,400 and PDI of 1.1 was prepared as described in Example 2 from 1020 grams of styrene, 60 grams of oleic acid, 9.5 grams of DBTTC and 18 grams of KOH. A 2,480-gram portion of this latex was combined with water (2,640 grams) and 1,3-butadiene (1,090 grams) in 2-gallon reactor. The reactor was flushed with nitrogen and heated to 50° C. The extent of polymerization was monitored by withdrawing aliquots (50 milliliters) of latex from the reactor. A small amount of Carax was added to each sample to inhibit further reaction. Approximately 5 milliliters of each sample were evaporated in an aluminum weighing pan to constant weight at 25° C. The remainder was coagulated with dilute aqueous HCl to produce solid polymer, which was filtered, washed with water, air-dried at 25° C. and analyzed by GPC (THF, 25° C.). Experimental data for samples collected over a 9.5 hour time period are collected in the table below. Plots of % butadiene conversion versus reaction time and $M_n$ versus reaction time are shown below. As expected for DBTTC-controlled polymerization, both $M_n$ and % solids in the latex increase as both time and butadiene conversion increase. Below 50% butadiene conversion, the polymer is soluble in THF (25° C.) and its PDI is low (1.1-1.5). At higher conversion, the PDI increases and the polymer is poorly soluble or insoluble in THF, consistent with radical-induced crosslinking of butadiene segments.

| Time (h) | % solids | % BD conversion | Solubility in THF at 25° C. | $M_n$ | PDI |
|---|---|---|---|---|---|
| 0 | 8.87 | 0 | soluble | 31,400 | 1.1 |
| 1 | 11.7 | 16.2 | soluble | 45,500 | 1.1 |
| 2 | 12.1 | 18.5 | soluble | 47,900 | 1.1 |
| 4 | 14 | 29.4 | soluble | 51,100 | 1.2 |
| 6 | 18 | 52.4 | soluble | 94,100 | 1.5 |
| 8 | 23.3 | 82.8 | partly soluble | 216,800 | 2.0 |
| 8.5 | 24.1 | 87.4 | mostly insoluble | — | — |
| 9 | 25.1 | 93.1 | insoluble | — | — |
| 9.5 | 26.3 | 99.3 | insoluble | — | — |

Example 45

ROMP Polymerization Using Grubb's Catalyst in Emulsion 100 milliliter 2-neck round bottom reaction flask equipped with a magnetic stirrer, condenser and nitrogen inlet was initially charged with 0.172 grams (0.0008 moles) of $K_3PO_4$ and 0.085 grams (0.0015 moles) KOH in 40 milliliters water. A solution of 4.2 grams (0.0385 moles) of cyclooctene and 0.92 grams (0.002 moles) of dodecylbenzenesulfonic acid (70% in 2-propanol) in 2 milliliters toluene was prepared and added to the aqueous solution to form an emulsion instantaneously. To this emulsion, a solution of 0.1 grams (0.00012 moles) of bis(tricyclohexylphosphine)benzylidineruthenium (IV)dichloride (Grubbs catalyst) in 2 milliliters toluene was added with stirring and the reaction mixture was stirred for 17 hours at 20° C. The polymer gave $M_n$ of 42,000 with a PDI of 1.45.

A solution of 2.63 grams (0.028 moles) of norbornene in 1 milliliter toluene was added to this latex, and the reaction mixture further stirred under nitrogen ($N_2$) for an additional 3 hours. A block copolymer (4.3 grams) with $M_n$ of 108,000 with a PDI of 1.7 was obtained.

Example 46

ADMET Polymerization Using Grubbs Catalyst in Emulsion

A 25 milliliter 2-neck round bottom reaction flask equipped with a magnetic stirrer, condenser and nitrogen inlet was initially charged with 0.12 grams (0.00057 moles) of $K_3PO_4$ and 0.038 grams (0.00068 moles) KOH in 10 milliliters water. A solution of 2.2 grams (0.016 moles) of 1,9-decadiene and 0.3 grams (0.00065 moles) of dodecylbenzenesulfonic acid (70% in 2-propanol) in 1 milliliter toluene was prepared and added to the aqueous solution to form an emulsion instantaneously. To this emulsion, a solution of 0.1 grams (0.00012 moles) of bis(tricyclohexylphosphine)benzylidineruthenium(IV)dichloride (Grubbs catalyst) in 0.5 milliliter toluene was added with stirring and the reaction mixture was stirred for 60 hours at 20° C. to give a latex of poly(1,9-decadiene) 60% conversion by $^1$H-NMR as described by Wagener et al *Macromolecules* 2002, 35, 48.

While certain representative embodiments and details have been shown for the purpose of illustrating the subject invention, it will be apparent to those skilled in this art that various changes and modifications can be made therein without departing from the scope of the subject invention.

What is claimed is:

1. A block polymer which is comprised of an A block and a B block, wherein the A block is a polymer block which is comprised of a vinyl aromatic monomer selected from the group consisting of α-methyl styrene, t-butyl styrene, vinyl naphthalene, and divinyl benzene, and wherein the B block is a polymer block which is comprised of (a) methacrylonitrile and (b) a conjugated diolefin monomer, wherein the block copolymer has an A-B-A triblock polymer architecture.

2. A block polymer as specified in claim 1 wherein the conjugated diolefin monomer is 1,3-butadiene.

3. A block polymer as specified in claim 1 wherein the A block constitutes from 5 weight percent to 30 weight percent of the total weight of the block polymer and wherein the B block constitutes from 70 weight percent to 95 weight percent of the total weight of the block polymer.

4. A block polymer as specified in claim 1 wherein the A block constitutes from 12 weight percent to 25 weight percent of the total weight of the block polymer and wherein the B block constitutes from 75 weight percent to 88 weight percent of the total weight of the block polymer.

* * * * *